(12) United States Patent
Heinrich et al.

(10) Patent No.: US 12,330,346 B2
(45) Date of Patent: Jun. 17, 2025

(54) PELLETIZING APPARATUS FOR THE PRODUCTION OF POLYMER PELLETS

(71) Applicant: NORDSON CORPORATION, Westlake, OH (US)

(72) Inventors: Hubert Heinrich, Münster (DE); Dirk Schlief, Münster (DE)

(73) Assignee: Nordson Corporation, Westlake, OH (US)

( * ) Notice: Subject to any disclaimer, the term of this patent is extended or adjusted under 35 U.S.C. 154(b) by 30 days.

(21) Appl. No.: 18/012,049

(22) PCT Filed: Jun. 24, 2021

(86) PCT No.: PCT/US2021/038872
§ 371 (c)(1),
(2) Date: Dec. 21, 2022

(87) PCT Pub. No.: WO2022/005867
PCT Pub. Date: Jan. 6, 2022

(65) Prior Publication Data
US 2023/0158711 A1    May 25, 2023

(30) Foreign Application Priority Data
Jul. 3, 2020  (DE) .......................... 102020117680.5

(51) Int. Cl.
*B29B 9/06* (2006.01)
*B29B 17/02* (2006.01)
*B29B 13/04* (2006.01)

(52) U.S. Cl.
CPC .............. *B29B 9/065* (2013.01); *B29B 17/02* (2013.01); *B29B 13/04* (2013.01); *B29B 2017/0224* (2013.01); *B29B 2017/0282* (2013.01)

(58) Field of Classification Search
CPC ... B29C 48/345; B29C 48/92; B29C 48/0022; B29B 9/06; B29B 9/065; B29B 13/04; B29B 48/95; B29B 2017/0224
See application file for complete search history.

(56) References Cited

U.S. PATENT DOCUMENTS

| | | | |
|---|---|---|---|
| 2006/0157879 A1* | 7/2006 | Gneuss | B29C 48/273 264/40.1 |
| 2010/0320628 A1* | 12/2010 | Holmes | B29C 48/05 264/5 |

(Continued)

FOREIGN PATENT DOCUMENTS

| | | |
|---|---|---|
| CN | 111469300 A | 7/2020 |
| EP | 1713840 B1 | 4/2019 |

(Continued)

OTHER PUBLICATIONS

IPEA/409—International Preliminary Report on Patentability Mailed on Jan. 13, 2023 for WO Application No. PCT/US21/038872.

(Continued)

*Primary Examiner* — Thu Khanh T. Nguyen
(74) *Attorney, Agent, or Firm* — BakerHostetler

(57) ABSTRACT

A pelletizing apparatus includes a filter device connected with a melt feed, a granulator downstream of the filter device, particularly an underwater granulator, a water treatment device, and a control means for controlling the filter device, underwater granulator, and water treatment device and adapted to provide at least one control parameter. The apparatus includes at least one machine-readable and -writable identification means for storing and providing an item of component-specific information and being associated with a component in the flow path of the melt or the process water, and a reading device communicating with the control means to receive the component-specific information from the identification means, and a writing device to write the (Continued)

identification means with the component-specific information, the control means to adapt the control parameter based on the component-specific information to provide the component-specific information, and, based on the component-specific information, to execute a diagnostic process.

21 Claims, 19 Drawing Sheets

(56) References Cited

U.S. PATENT DOCUMENTS

| | | |
|---|---|---|
| 2013/0062804 A1 | 3/2013 | Takamoto et al. |
| 2015/0037447 A1 | 2/2015 | Rechter et al. |
| 2018/0126650 A1* | 5/2018 | Murphree ............ B29C 64/245 |

FOREIGN PATENT DOCUMENTS

| | | |
|---|---|---|
| WO | 2005/068516 A2 | 7/2005 |
| WO | 2020/247215 A1 | 12/2020 |

OTHER PUBLICATIONS

ISA/206—Invitation to Pay Additional Fees Mailed on Oct. 12, 2021 for WO Application No. PCT/US21/038872.
ISA/220—Notification of Transmittal or Search Report and Written Opinion of the ISA, or the Declaration Mailed on Dec. 3, 2021 for WO Application No. PCT/US21/038872.

* cited by examiner

PELLETIZING APPARATUS FOR THE PRODUCTION OF POLYMER PELLETS

CROSS REFERENCE TO RELATED APPLICATIONS

This application is a National Stage Application of International Patent App. No. PCT/US2021/038872, filed Jun. 24, 2021, which claims the benefit of German Patent Application No. 102020117680.5, filed Jul. 3, 2020, the entire disclosures of both of which are hereby incorporated by reference as if set forth in their entirety herein.

TECHNICAL FIELD

The present invention concerns a pelletizing apparatus for the production of polymer pellets, in particular granules, including
a filter device which can be connected in fluid-conducting relationship to a melt feed for separating dirt particles and impurities from a polymer melt,
a granulator arranged downstream of the filter device, for the production of polymer pellets,
a water treatment device for cleaning process water from the granulation of residues of the polymer melt, and
a control means which for controlling the filter device and/or the granulator and/or the water treatment device is adapted to provide at least one control parameter.

The invention further concerns a filter device, a granulator, a water treatment device and methods of controlling same.

BACKGROUND

Pelletizing apparatuses of the kind set forth in the opening part of this specification are generally known. They are used to provide thermoplastic polymers which are processed for example by injection molding or blow molding to give finished products, in the form of pellets or granules. Such pellets or granules are produced from thermoplastic polymers, to which additional substances or additives like color pigments or reinforcing substances are added in many cases.

A melt feed can preferably be coupled in fluid-conducting relationship preferably to a melting device for melting polymers or can itself be part of the melting device. Equally the melt feed can be coupled in fluid-conducting relationship to a reactor for reactive production of polymers.

In known pelletizing apparatuses a polymer melt is fed to a filter device. The polymer melt comprising thermoplastic polymers can be melted for example by means of a melting apparatus and preferably conveyed by means of a melting pump through the melt feed.

It is known in the state of the art to use filter devices of the above-indicated general kind in order to filter dirt particles or impurities, for example in the form of metal pieces, out of a flow of material, in particular a continuously flowing polymer melt. Particularly in the recycling of plastic waste where metal pieces or other troublesome dirt particles are frequently contained among the comminuted pieces of plastic it is necessary for them to be separated off before further processing of the plastic to give new products. For that purpose, the plastic waste is converted into a polymer melt by heating and introduced into a filter device with a cleaning device of the above-indicated general kind. The cleaned polymer melt is then fed to a shaping tool.

A working unit like a granulator is usually connected downstream of such a filter device. Such a granulator can involve for example an underwater granulator, a water ring granulator or a strand granulator. If, for example, an underwater granulator is used as the working unit the polymer melt is divided into individual polymer strands by a shaping tool and divided into individual pellets by a downstream-connected cutting tool, which pellets are cooled by means of cooling water.

The process water used by the underwater granulator is fed to a water treatment device. That device filters impurities and residues, in particular residues of the polymer melt.

Maintenance of the filter device, the underwater granulator and the water treatment device in that case leads to a production stoppage and thus breakdowns in production. In a pelletizing apparatus of the general kind set forth the components of the filter device, the underwater granulator and the water treatment device in the flow path of the melt or the process water which is contaminated with residues from the melt are subject to particular wear. Such wearing components are for example filters, valves, cutting tools, shaping tools and water filters.

The distance between the maintenance intervals and the service life of the wearing components of the pelletizing apparatus depend in that case on the throughput or volume flow, the kind of polymer used and optionally component-specific parameters of the filter device, the underwater granulator and the water treatment device.

As described hereinbefore in that respect in particular but not definitively filters, valves, cutting tools, shaping tools and water filters are exposed to increased wear. Monitoring those components is therefore an aspect of particular interest.

SUMMARY

To avoid production breakdowns, it is necessary in most cases to accurately document the precise period of use and in particular the number of production cycles implemented in order at least approximately to be able to ensure the service life or the need for timely maintenance of the wearing components of the pelletizing apparatus. That documentation is highly complicated and laborious and for that reason at the same time is also susceptible to error. To avoid plant breakdowns therefore the wearing components are frequently replaced long before the end of their service life.

The design configuration of the pelletizing apparatus characterized by the component-specific parameters of the filter device, the underwater granulator and the water treatment device influence in that respect the control parameters which are required for optimum operation of the pelletizing apparatus. In that respect, for optimum operation of the pelletizing apparatus, it is necessary to adapt all operating parameters of the control means manually in accordance with the components used.

Components which are provided with a bar code are known in this context from the state of the art, which by manual scanning of the bar code prior to installation and information related to the component allow access to component-specific items of information which are integrated in a database. Information acquisition in that case by manually scanning in each component prior to installation is very laborious and complicated. In addition, in the event of system breakdowns there can be a data loss which requires repeated scanning of the components which are actually fitted in place. The components have to be dismantled for that purpose as component identification is not possible in the installed state.

In addition, the components known from the state of the art and provided with a bar code only permit unilateral information exchange. In terms of maintenance and fault analysis it is therefore not possible to draw conclusions about the preceding operation and the other installation components which can have a substantial influence on the wear of the respective component.

Therefore, it was an object of the invention at least to improve one of the disadvantages described in the state of the art. In particular an object of the invention was to provide a pelletizing apparatus which permits optimized production and maintenance operation.

The object of the invention is attained by a pelletizing apparatus according to the claims. In addition, the object of the invention is attained by a filter device, a granulator, a water treatment device, an apertured plate, a blade head, a filter for a filter device and/or a water filter as disclosed.

In particular in a pelletizing apparatus of the kind set forth in the opening part of this specification the object of the invention is attained by at least one machine-readable and -writable identification means for storing and providing at least one component-specific item of information, wherein the identification means is associated with a component in the flow path of the polymer melt or the process water, and a reading device which is connected in signal-conducting relationship to the control means and which is adapted to receive the component-specific information from the identification means, and a writing device which is adapted to write and/or overwrite the identification means with the component-specific information, wherein the control means is adapted to adapt the control parameter in dependence on the component-specific information, to provide the component-specific information and in particular based on the component-specific information to execute a diagnostic process.

Accordingly, the respective component in the flow path of the polymer melt bears substantial information about the component itself, which can have an influence both on the control parameters and also the component wear itself. By virtue of storage of the component-specific information on an identification means each component itself is the carrier of the essential information. It is to be noted in this connection that in particular components in the flow path of the melt involve components which are very highly susceptible to wear.

In addition, the identification means can preferably be read out in the installed state of the respective component. Equally in the case of alterations in respect of the configuration of the pelletizing apparatus, it is possible to implement suitable overwriting of the component-specific information in the installed state of the respective component.

According to the invention a maximum service life can be stored on an identification means, which in turn changes if for example a filter with a differing filter unit is used in the filter device arranged upstream. In that case a lower degree of filter fineness would have the result that the polymer melt is more seriously contaminated. Such residues can involve inter alia reinforcing materials which in turn lead to increased abrasive wear of the cutting tool of the granulator. According to the invention such a change in the filter of the filter device would then be documented on the identification means of the cutting tool. In addition, the probable service life of the cutting tool could be appropriately adapted and stored on the identification means of the cutting tool.

The stored information also affords advantages in regard to system breakdowns and diagnostic processes. The storage of the corresponding items of information on the component permits diagnostic processes on the part of the manufacturer, without the corresponding service personnel having to be on site. A prematurely failed component can thus be sent for example to the manufacturer and the identification means can be read off at the manufacturer. Alternatively, the identification means can also be read out by the manufacturer over the Internet when there is a suitable data connection. In that respect it is no longer necessary for service personnel from the manufacturer to analyze the installations on site or to study the machine record books, but all essential information can be acquired and read out at the component itself. Equally the component-specific information can be made available to a user, preferably by means of a user interface associated with the control means. Particularly preferably it is also possible for diagnostic processes to be carried out by the control means and in particular warning messages or instructions in respect of maintenance and/or repair recommendations can be supplied.

The inventors further realized that it is advantageous if at least one control parameter which is provided by the control means is adapted in dependence on the component-specific information. Particularly preferably even a multiplicity of control parameters is appropriately adapted.

Preferably there is provided at least one control parameter for the filter device, a control parameter for the granulator and a control parameter for the water treatment device, and all of those control parameters are adapted in dependence on the component-specific information of at least one identification means, preferably a multiplicity of identification means. Operation of the pelletizing apparatus can be optimized in that way. In that respect the wear is reduced over a long period as the individual components like the filter device and the granulator can be adjusted to each other in the optimum fashion. Erroneous operation by the installation personnel can thus be effectively avoided. In addition, the service life of the components is efficiently utilized and premature replacement by virtue of incorrectly implemented documentation of the operating cycles and installation parameters is avoided.

According to a preferred embodiment the filter device has at least one filter element arranged in the flow path of the polymer melt for filtering the polymer melt and the identification means is associated with the filter element, and in particular is mounted to the identification means.

The inventors advantageously realized that the filter element of the filter device is exposed to particular stresses due to the high temperatures caused by the temperature-controlled molten polymer and in addition also severe contamination due to residues of the thermoplastic polymer melt. Filter elements are therefore to be cleaned and replaced at regular intervals. They realized that the maintenance intervals are dependent on the filter area and filter fineness as well as the material throughput and the kind of polymer so that it is particularly advantageous to provide component-specific information in respect of the filter element in machine-readable and machine-writable fashion on an identification means. In addition, in that way relevant component-specific information of the filter element can also be read out in operation. In that way in particular the number of cleaning operations performed can be documented on the filter element itself.

Further preferably the filter element is cylindrical, in particular in the form of a filter basket, and the identification means is mounted to the peripheral surface of the filter basket. In that way the identification means can be arranged outside the flow path and the influence on the flow of the polymer melt can be reduced. Arranging it on the peripheral surface also permits easier readability as the spacing relative to the housing is comparatively small and screening by adjacent components of the installation is reduced.

According to a preferred embodiment the underwater granulator has an apertured plate arranged in the flow path of the polymer melt for the production of a plurality of polymer strands and a blade head mounted rotatably about its longitudinal axis for separating the polymer strands into individual pellets and a respective identification means is associated with the apertured plate and/or the blade head, and in particular is mounted to the apertured plate and/or the blade head.

Such an apertured plate provides a shaping tool that is simple to manufacture and that desirably divides the polymer melt into individual polymer strands. In addition, a rotatably mounted blade head is an efficient cutting tool which can be compactly mounted in place. Both the apertured plate and also the blade head in that case represent wearing components, which are permanently in contact with the polymer melt and, in that case, involve both high temperatures and also increased abrasive wear caused by the polymer melt or the polymer strands and the residues which are contained therein, and which are not filtered out by the filter device.

Preferably the apertured plate is of a substantially round cross-section and includes a heating flange and a preferably replaceable cutting plate which can be introduced into a corresponding receiving means of the heating flange, wherein at least one respective identification means is mounted to the heating flange, in particular the periphery of the heating flange and/or a surface at the outlet side of the cutting plate. In that way the cutting plate which is particularly susceptible to wear is accommodated in the heating flange replaceably in the form of a separate component. The heating flange which is heatable for example by means of oil or electrically can thus remain in the underwater granulator while the cutting plate is removable for maintenance purposes. It is particularly advantageous in that respect if an identification means is associated with the heating flange and an identification means is associated with the cutting plate respectively. The arrangement or mounting of the identification means at the periphery of the heating flange and equally at the outlet-side surface of the cutting plate permits reduced screening by adjacent components of the underwater granulator and thus permits better signal transmission.

Further preferably the blade head has a main body and a multiplicity of severing bodies each having a severing surface, wherein at least one respective identification means is mounted to the main body, in particular a surface extending in orthogonal relationship with the longitudinal axis, and/or to the blade spaced in relation to the severing surface. By virtue of the fact that the severing bodies are connected to the main body to constitute a one-piece blade head stresses which occur due to forces at the moment of the cutting operation are more uniformly distributed in the entire blade head and stress peaks are avoided. The one-piece design configuration makes manufacture easier with a shaping method like metal casting, metal sintering or other shaping production methods. Additional ribs can be provided in the region of stress peaks, in particular at the transition between the rearward region of the cutting body and the main body in order to optimize the stressing configuration. Arranging the identification means at the surface of the main body, in particular in orthogonal relationship with the longitudinal axis, provides an adequate surface for receiving the identification means and the identification means is protected from impact with the severed polymer pellets. In addition, arranging the identification means on the cutting bodies in spaced relationship with the cutting surface protects the identification means from damage.

Further preferably the blade head has a main body and a plurality of cutting or severing bodies each having a respective cutting or severing surface which are preferably releasably, in particular replaceably, coupled to the main body, wherein at least one respective identification means is mounted to the main body, in particular a surface extending in orthogonal relationship with the longitudinal axis, and/or at the cutting or severing body in spaced relationship with the cutting or severing surface.

Further preferably the granulator has a granulator housing and the blade head is mounted rotatably in the housing at an entrainment member for the blade head, wherein at least one respective identification means is associated with the entrainment member and/or the granulator housing, in particular being mounted to the entrainment member.

Such an entrainment member serves for coupling the blade head to a drive shaft, wherein the entrainment member preferably orients the blade head or re-adjusts it in operation and provides for an optimum parallel arrangement of the main body or the surface thereof and the apertured plate.

Particularly advantageously such an entrainment member can be used for blade heads of differing sizes, wherein the blade head preferably has an opening therethrough and the entrainment member is shaped to correspond to the opening and in particular is accommodated therein in such a way that the blade head is mounted to the entrainment member. By mounting an identification means to the entrainment member in addition component-specific information about the entrainment member and moreover about the blade heads used in the past as well as the current blade head can be stored.

Further preferably the entrainment member has a shaft and a support portion which is coupled to the shaft and which can be brought into contact with the blade head, wherein at least one respective identification means is mounted to the shaft and/or the support portion. This therefore provides a desirable arrangement in which the blade head is mounted on the entrainment member and by virtue of being brought into contact with the support portion is further oriented relative thereto and is secured to prevent pivotal movement relative to the axis of rotation.

Preferably the underwater granulator has a cooling chamber at least partially filled with cooling fluid for cooling the polymer strands and/or the pellets and the apertured plate and the blade head are at least partially arranged in the cooling chamber.

Usually the cooling water is passed into the cooling chamber from below or through the drive shaft of the blade head in order to ensure complete filling thereof with cooling water at any time. The discharge of the cooling water which entrains therewith the granules formed in the cooling chamber in the form of a solid-water mixture is usually disposed in the upper part of the cooling chamber. The discharge is connected to a pipeline which transports the granules preferably to a separation device. Therein the set granules are preferably separated from the cooling water and then dried.

The apertured plate is preferably heated so that the polymer there is not hardened.

The polymer melt is pressed through the apertured plate in the underwater granulator. The polymer strand issuing at the apertured plate is severed by a blade head rotating preferably immediately along the apertured plate opening. Such a blade head preferably has a plurality of cutting blades which divide up the strands of the issuing polymer into short strand portions or pellets in a cutting plane which is parallel to the discharge plane of the apertured plate.

The apertured plate and the blade head are preferably disposed at least partially in a cooling chamber so that the strands are cooled down immediately after issuing from the apertured plate. In that arrangement the entire cooling chamber is filled with cooling water and has the water flowing therethrough. Both the apertured plate and also the blade head are subjected to thermal stresses caused by contact with the cooling water in the cooling chamber on the one hand and the hot polymer melt on the other hand. In addition, both components are subject to increased abrasive wear caused by contact with the polymer melt. Production has to be temporarily interrupted to change the blade head and the apertured plate respectively. Such an arrangement advantageously provides for rapid cooling of the polymer strands and governed thereby it makes it possible to provide a compact structure by virtue of the blade head being arranged directly after the apertured plate. At the same time however such an arrangement also involves increased wear due to the arrangement of the blade head and the apertured plate in the cooling water. The association of the identification means with the apertured plate and the blade head continuously provides for monitoring, overwriting of the component-specific data and optimized creation of control parameters. In that way the adverse effects of the arrangement of the apertured plate and the blade head in the cooling chamber can be outweighed.

The maintenance intervals here are also dependent on the material throughput or the volume flow and the kind of polymer and also inter alia on the number of cutting edges of the blade head, the number of holes and the hole diameter in the apertured plate, as well as the purity of the polymer melt governed by the filter fineness of the filter device. In addition, a valve which is possibly connected upstream, in particular a start-up valve, influences the wear of the apertured plate due to discharging or carrying away parts of the polymer melt, that first pass through the flow path and entrain any residues of previous processes which possibly were not completely melted.

The operating parameters of the blade head like the speed of rotation are in that respect to be selected in dependence on the apertured plate used, the volume flow, the kind of polymer used and the temperature of the cooling water. In addition, those components and in particular the component-specific parameters thereof like for example the hole diameter and the number of holes in the apertured plate in turn govern both the wear and also the appropriate operating parameters for the other component parts of the pelletizing apparatus.

According to a preferred embodiment the water treatment device has at least one water filter for filtering the process water and the identification means associated with the water filter.

In that case the water filter represents a component of the water treatment device, that is highly susceptible to wear. The water filter is contaminated by the polymer melt residues and has to be regularly cleaned. The degree of wear and the service life of the water filter are governed by the fineness of the filter of the filter device as well as the component-specific parameters of the apertured plate and the blade head of the underwater granulator. The provision of component-specific information for the water filter and the possibility of overwriting and adapting those items of information on the identification means by the writing or reading device permits optimized monitoring of the water filter and a more precise prediction of the degree of contamination. In that way the maintenance-free process times can be increased and thus consequently production can be made more efficient. Such a sieve cassette permits cleaning of parts of the filter surface in ongoing operation. The appropriate time for rotation in dependence on the water level permits reliable and continuous operation. Upon changes in the production procedure or system disturbances the target water level at which rotation of the sieve cassette takes place can be overwritten.

Preferably the water filter is in the form of a sieve cassette having a frame structure and a multiplicity of sieve surfaces and the identification means is mounted to the frame structure. Water systems, in particular self-cleaning temperature-controlled water systems, are equipped with water filters which are accommodated in a sieve cassette. The water level in the filter unit is monitored. If the water level rises the sieve cassette is rotated by a gear motor so that there are always clean water filters in the filter region. The contaminated water filters are cleaned by water jet cleaning nozzles. The contamination is sprayed on to an inclined chute and deposited in a sieve cassette which has to be regularly cleaned.

The inventors advantageously realized that, besides the filter elements of the filter device, the sieve cassette is also subjected to particular stresses due to the severe contamination due to residues of the thermoplastic polymer melt. The sieve cassette is therefore also to be cleaned and replaced at regular intervals. They realized that the maintenance intervals of the sieve cassette are dependent on the filter area and filter fineness as well as the material throughput and the nature of the polymer. Accordingly, relevant component-specific information in respect of the sieve cassette can also be read out in operation. Thus, in particular the number of cleaning operations carried out can be documented on the sieve cassette itself.

Further preferably, the water filter, in particular the sieve cassette, is a first water filter, and the water treatment device further has a second water filter which is in the form of a filter having a filter belt and a receiving means for the filter belt and the identification means is mounted to the receiving means.

The filter or a continuously operating filter belt is preferably cleaned with a scraper and spray nozzles.

The degree of cleaning of the process water to be treated can be increased by a supplementary filter. Residues which remain through the sieve cassette which has at least a lesser filter fineness can be removed from the process water by the filter in that way. Preferably in that arrangement the filter has an identification means. Accordingly, this also provides at least one item of component-specific information for the filter, that influences the control parameter provided by the control means. If, for example, cleaning of the filter is required then the pump efficiency of a melt pump can be for example reduced in order temporarily to provide a lesser material volume flow and to allow cleaning of the filter.

According to a preferred embodiment the component-specific information stored on the identification means can be read magnetically, by way of infrared or radio and/or can be written and/or overwritten by the writing device. In that way the identification means can be read out without contact and without a visual connection by the reading device.

Such contactless reading by means of magnetic transmission, infrared or radio waves provides an appropriate signal transmission which even in ongoing operation permits the identification means to be read out. The arrangement of the reading and/or writing device in a pelletizing apparatus component or a machine frame or a stationary portion of a production installation ensures that the reading and/or writing device is sufficiently close to the components carrying the identification means to permit the identification means to be reliably read out even in ongoing operation.

Preferably the reading and/or the writing device is arranged at a component of the pelletizing apparatus or a machine frame or a stationary portion of a production installation. In that way operation of the pelletizing apparatus is not influenced and there is no need for the reading and/or writing device to be guided manually by operators to the identification means.

Further preferably the component-specific information is one of the following:
- an article number,
- a drawing number,
- a serial number,
- a material indication of the respective component,
- the component size or dimension,
- the component shape,
- a composition and/or coating thickness of the wear coating, and
- an embodiment of series products,
- a (target) filling state,
- a maximum power, and
- a coefficient of friction or a surface quality.

What is common to those items of information is that they contain information which allows conclusions to be drawn about the service life of the component itself and linked thereto also the effects thereof on the corresponding components of the pelletizing apparatus.

Further preferably the control parameter is one of the following:
- a rotary speed,
- a speed,
- a temperature,
- a conveyor volume flow,
- a pressure, and
- a power output.

Adaptation or provision of at least one of those control parameters at least indirectly influences the wear and the operation of the pelletizing apparatus.

According to a preferred embodiment the control means is further adapted in dependence on the component-specific information and at least one control parameter to determine whether
- a cleaning operation, and/or
- a maintenance operation, and/or
- a replacement of the component provided with the identification means and/or a cooperating component is required.

The inventors advantageously realized that the component-specific information in combination with at least one control parameter permits conclusions about the degree of wear, the service life and contamination so that in dependence on that information or parameters it is desirably possible to ascertain whether a cleaning operation and/or a maintenance operation and/or replacement of the component provided with the identification means and/or a corresponding component is required.

Preferably the writing device and the reading device form an integrated reading and writing device for reading and writing and/or overwriting the identification means. In that way the identification means can be both written and also read with just one device. The reading operation can therefore preferably be affected in operation precisely like overwriting of the identification means.

According to a preferred embodiment the pelletizing apparatus further includes:
a melting apparatus arranged upstream of the filter device for liquifying thermoplastic polymers to give a polymer melt, which is coupled in fluid-conducting relationship to the filter device. Preferably the control means is adapted to control the melting apparatus and provide at least one control parameter for controlling the melting apparatus. In that way advantageously melting of the thermoplastic polymer to give a liquified polymer melt can be controlled by means of the melting apparatus by the control means and the influence thereof in relation to the control parameters can be taken into consideration by the control means.

Preferably the melting apparatus is coupled to a melt pump for conveying the polymer melt in the direction of the filter device. When using a melt pump the volume flow of the polymer melt to be conveyed can be set for example by means of a pump motor. The operating parameters or such a pump motor are to be selected in dependence on the downstream-connected components of the pelletizing apparatus, in particular the filter device and the underwater granulator.

Preferably arranged in the flow path between the filter device and the granulator is a valve having a valve body and a valve housing, preferably a start-up valve, and wherein the identification means is associated with the valve and in particular is mounted to the valve housing.

Start-up valves are used in granulators to flush the apertured plate prior to the start and also at the start of a process, in a so-called start-up position, to selectively feed initially only a part of the melt to the apertured plate. The start-up valve is adapted to accommodate the cone of an apertured plate, to optimize the melt flow and to minimize the residence time of the melt.

As described hereinbefore the object of the invention is attained in a first aspect by a pelletizing apparatus. In a second aspect the invention concerns a filter device for a pelletizing apparatus, in particular for a pelletizing apparatus according to a first aspect of the invention, for separating dirt particles and impurities from a polymer melt, wherein the filter device is adapted to be coupled in fluid-conducting relationship to a melt feed and/or a melting apparatus and a downstream granulator, and at least one filter element arranged in the flow path of the polymer melt for filtering the polymer melt, and wherein the filter device is connected in signal-conducting relationship to a control means for controlling the filter device, which is adapted to provide at least one control parameter, in particular a rotary speed, a speed, a temperature, a conveyor volume flow or a pressure.

The invention attains the object in a second aspect by at least one identification means for storing and providing at least one item of component-specific information, wherein the identification means is associated with the filter, and a respective reading and writing device which can be connected in signal-conducting relationship to the control means and which is adapted to receive the component-specific information from the identification means and to overwrite or supplement same, and wherein the control means is adapted to adapt the control parameter in dependence on the component-specific information, to provide the component-specific information and in particular based on the component-specific information to execute a diagnostic process.

Preferred embodiments and advantages of the pelletizing apparatus according to the invention are at the same time preferred embodiments and advantages of the filter device for such a pelletizing apparatus.

According to a preferred embodiment the filter device is a sieve changer and the filter element is a first filter element in the form of a sieve and the filter device further has a second filter element in the form of a second sieve, wherein in normal operation the polymer melt is filtered by the first sieve and the second sieve and is filtered in the cleaning operation selectively by only one of the sieves. In that arrangement the filter elements are used for filtration of polymer melt in a sieve carrier or a sieve basket of such a sieve changer. With increasing contamination, it is provided in many sieve changers that the melt flow is diverted to another sieve basket with another filter element. While the production flow is maintained while that happens the contaminated filter element will be freed of the particles adhering thereto by a backflushing operation. For that purpose, a part of the melt is passed through the filter element in a flow direction opposite to normal operation so that the particles adhering to the filter media of the filter element are detached and flushed away.

The sieves are preferably of an areal configuration, in particular round.

According to a further preferred embodiment the filter device includes
- a filter housing having a filter chamber and an inlet for introduction of polymer melt into the filter chamber and an outlet for discharge of polymer melt from the filter chamber and a dirt outlet for the discharge of dirt particles from the filter housing,
- a filter element which is arranged in the filter chamber and through which the polymer melt can be passed, and which is adapted to retain dirt particles contained in the polymer melt, and
- a cleaning device for cleaning the filter element of dirt particles retained by means of the filter element, which has a cleaning head having at least one scraper body for detaching dirt particles from the filter element, wherein the cleaning head and the filter element are moveable relative to each other and can be at least at times brought into contact with each other, wherein the at least one scraper body is coupled to an adjusting device adapted to press the scraper body against the surface of the filter element.

The contaminated melt flows through the stationary cylindrical filter basket from the inside outwardly. The conical microbores provide for efficient filtration of the highly contaminated melt. The contamination is removed from the melt and scraped from the surface of the filter basket by a rotating blade shaft. The discharge screw conveys the collected impurities out of the machine. The speed of rotation of the blade shaft/discharge screw can be adapted in accordance with the throughput amount, the degree of contaminated and the discharge speed and thus provides for a continuous working process with a clean, open filter surface with a low degree of melt loss.

Production is temporarily interrupted for the change in the filter basket. The discharge unit is detached so that the machine housing including the contaminated filter basket can be removed.

In a third aspect the invention concerns a filter element, in particular for a filter device according to the second aspect of the invention, for separating dirt particles and impurities from a polymer melt.

In a third aspect the invention attains the object thereof by at least one identification means for storing and providing at least one item of component-specific information, and at least one filter element, wherein the identification means is associated with the filter, wherein the identification means is adapted in particular in the installed state of the filter element to be read out by a reading device and to be written and/or overwritten by a writing device.

Preferred embodiments and advantages of the filter device according to the invention are at the same time preferred embodiments and advantages of the filter element for such a filter device.

As described hereinbefore in a first aspect the object of the invention is attained by a pelletizing apparatus, in a second aspect by a filter device and in a third aspect by a filter element. In a fourth aspect the invention concerns a granulator for producing or creating polymer pellets, in particular for a pelletizing apparatus according to the first aspect of the invention, which is adapted to be coupled in fluid-conducting relationship to an upstream filter device and/or a melt feed, wherein the granulator has an apertured plate arranged in the flow path of the polymer melt for the production of a multiplicity of polymer strands and a blade head for severing the polymer strands into individual pellets and the identification means is associated with the apertured plate and/or the blade head, and is connected in signal-conducting relationship to a control means for controlling the granulator, which is adapted to provide at least one control parameter, in particular a rotary speed, a speed, a temperature, a conveyor volume flow or a pressure.

The invention attains the object thereof in a fourth aspect by at least one identification means for storing and providing at least one item of component-specific information, wherein a respective identification means is associated with the apertured plate and/or the blade head, and a respective reading and writing device which can be connected in signal-conducting relationship to the control means and which is adapted to receive the component-specific information from the identification means and to overwrite or supplement same, and wherein the control means is adapted to adapt the control parameter in dependence on the component-specific information, to provide the component-specific information and in particular based on the component-specific information to execute a diagnostic process.

Preferred embodiments and advantages of the pelletizing apparatus according to the invention are at the same time preferred embodiments and advantages of the underwater granulator for such a pelletizing apparatus.

In a fifth aspect the invention concerns an apertured plate for the production of a plurality of polymer strands, in particular for an underwater granulator according to the fourth aspect of the invention.

The invention attains the object thereof in a fifth aspect by at least one identification means for storing and providing at least one item of component-specific information of the apertured plate, wherein the identification means is associated with the apertured plate, wherein the identification means is adapted in particular in the installed state of the apertured plate to be read out by a reading device and written and/or overwritten by a writing device.

Preferably the apertured plate is a replaceable cutting plate, with the identification means being fixed to the cutting plate.

Preferred embodiments and advantages of the underwater granulator according to the invention are at the same time preferred embodiments and advantages of the apertured plate for such an underwater granulator.

In a sixth embodiment the invention concerns a blade head for cutting the polymer strands into individual pellets, in particular for an underwater granulator according to the fourth aspect of the invention.

The invention attains the object thereof in a sixth aspect by at least one identification means for storing and providing at least one item of component-specific information of the blade head, wherein the identification means is associated with the blade head, wherein the identification means is adapted in particular in the installed state of the blade head to be read out by a reading device and written and/or overwritten by a writing device.

Preferred embodiments and advantages of the underwater granulator according to the invention are at the same time preferred embodiments and advantages of the blade head for such an underwater granulator.

The object of the invention as described hereinbefore is attained by a pelletizing apparatus, a filter device, a filter element, an underwater granulator, an apertured plate and a blade head. The invention in a seventh aspect concerns a water treatment device for cleaning process water from the granulation operation, in particular underwater granulation, of residues of the polymer melt, in particular for a pelletizing apparatus according to the first aspect of the invention, which is adapted to be coupled in fluid-conducting relationship to an upstream underwater granulator, wherein the water treatment device has at least one water filter for filtering the process water and the identification means is associated with the water filter, and is connected in signal-conducting relationship to a control means for controlling the water treatment device, which is adapted to provide at least one control parameter, in particular a rotary speed, a speed, a temperature, a conveyor volume flow or a pressure.

The invention attains the object thereof in a seventh aspect by at least one identification means for storing and providing at least one item of component-specific information, wherein the identification means is associated with the water filter, and a respective reading and writing device which can be connected in signal-conducting relationship to the control means and which is adapted to receive the component-specific information from the identification means and to overwrite or supplement same, and wherein the control means is adapted to adapt the control parameter in dependence on the component-specific information, to provide the component-specific information and in particular based on the component-specific information to execute a diagnostic process.

Preferred embodiments and advantages of the pelletizing apparatus according to the invention are at the same time preferred embodiments and advantages of the water treatment device for such a pelletizing apparatus.

Preferably the water filter is a filter belt which can be cleaned by means of a cleaning device, in particular a scraper. Accordingly, in ongoing operation the water filter can be cleaned as required and the cleaning operation can be controlled by the cleaning device in particular by control parameters, which can be affected in dependence on component-specific information provided by the identification means and control parameters.

Further preferably the filter is a first water filter in the form of a sieve cassette and the water treatment device further has a second water filter which is in the form of a filter with a filter belt and a receiving means for the filter belt. The reliability of the water filter is increased by a second filter.

The invention in an eighth aspect concerns a water filter for filtering process water for a water treatment device, in particular for a water treatment device according to the seventh aspect.

The invention attains the object thereof in an eighth aspect by at least one identification means for storing and providing at least one item of component-specific information of the water filter, wherein the identification means is adapted in particular in the installed state of the water filter to be read out by a reading device and to be written and/or overwritten by a writing device.

Preferred embodiments and advantages of the water treatment device according to the invention are at the same time preferred embodiments and advantages of the water filter for such a water treatment device.

The invention in a ninth aspect concerns a method of controlling a pelletizing apparatus, in particular a pelletizing apparatus according to one of the preceding claims, comprising the steps:

a) reading out at least one identification means which is associated with a component of the pelletizing apparatus in the flow path of a polymer melt and on which at least one item of component-specific information is stored, b) providing at least one respective control parameter for a filter device and an underwater granulator, and a water treatment device in accordance with the component-specific information, wherein the control parameter is one of the following:
a rotary speed,
a speed,
a temperature,
a conveyor volume flow,
a pressure,
a power output,
a predefined value for initiating a flushing or cleaning operation, and
a predefined value for initiating a maintenance operation, c) executing a plurality of diagnostic processes based on the monitored component-specific information in order thereby to monitor operation of the filter device and/or the granulator and/or the water treatment device and operation of the pelletizing apparatus as a whole and to provide at least one of the following items of information:
the time of the next maintenance of the filter device and/or the granulator and/or the water treatment device,
the remaining service life of at least one component in the flow path of the polymer melt,
a warning indication that faults were found in operation of the pelletizing apparatus, and d) repetition of steps a) to c) after each exchange of a component from the flow path of the polymer melt.

Accordingly, an identification means which is carried by the respective component in the flow path of the polymer melt has essential information about the component, which influences both the control parameters and also the component wear itself.

The inventors further realized that it is advantageous if the at least one control parameter provided by the control means is adapted in dependence on the component-specific information. Particularly preferably even a multiplicity of control parameters is appropriately adapted.

Advantages are also afforded by the stored information in relation to system breakdowns and diagnostic processes. The storage of the corresponding items of information on the component permits diagnostic processes at the manufacturer without corresponding service personnel having to be on site. In that way a prematurely failed component can be sent to the manufacturer and the identification means can be read out at the manufacturer. In that case, it is no longer necessary for service personnel from the manufacturer to analyze the installations on site or to study the machine books, but all essential information can be obtained and read out at the component itself.

As described hereinbefore in particular but not definitively filters, valves, apertured plate, blade heads and water filters are subjected to increased wear. Monitoring of those components is therefore of particular interest.

The invention in a tenth aspect concerns a method of controlling a filter device, in particular a filter device according to the second aspect of the invention, comprising the steps:
a) reading out at least one identification means which is associated with a component of the filter device in the flow path of a polymer melt and on which at least one item of component-specific information is stored,
b) providing at least one respective control parameter for the filter device in accordance with the component-specific information, wherein the control parameter is one of the following:
a rotary speed,
a speed,
a temperature,
a conveyor volume flow,
a pressure,
a power output,
a predefined value for initiating a flushing or cleaning operation, and
a predefined value for initiating a maintenance operation,
c) executing a plurality of diagnostic processes based on the monitored component-specific information in order thereby to monitor operation of the filter device and to provide at least one of the following items of information:
the time of the next maintenance of the filter device,
the remaining service life of at least one component in the flow path of the polymer melt,
a warning indication that faults were found in operation of the pelletizing apparatus, and
d) repetition of steps a) to c) after each exchange of a component from the flow path of the polymer melt.

Preferred embodiments and advantages of the method according to the invention of controlling a pelletizing apparatus are at the same time preferred embodiments and advantages of the method of controlling a filter device for such a pelletizing apparatus.

The invention in an eleventh aspect concerns a method of controlling a granulator, in particular an underwater granulator according to the fourth aspect of the invention, comprising the steps:
a) reading out at least one identification means which is associated with a component of the granulator in the flow path of a polymer melt and on which at least one item of component-specific information is stored,
b) providing at least one respective control parameter for the underwater granulator in accordance with the component-specific information, wherein the control parameter is one of the following:
a rotary speed,
a speed,
a temperature,
a conveyor volume flow,
a pressure,
a power output,
a predefined value for initiating a flushing or cleaning operation, and
a predefined value for initiating a maintenance operation,
c) executing a plurality of diagnostic processes based on the monitored component-specific information in order thereby to monitor operation of the underwater granulator and to provide at least one of the following items of information:
the time of the next maintenance of the underwater granulator,
the remaining service life of at least one component in the flow path of the polymer melt,
a warning indication that faults were found in operation of the underwater granulator, and
d) repetition of steps a) to c) after each exchange of a component from the flow path of the polymer melt.

Preferred embodiments and advantages of the method according to the invention of controlling a pelletizing apparatus are at the same time preferred embodiments and advantages of the method of controlling an underwater granulator for such a pelletizing apparatus.

The invention in a twelfth aspect concerns a method of controlling a water treatment device, in particular a water treatment device according to the seventh aspect of the invention, comprising the steps:
a) reading out at least one identification means which is associated with a component of the water treatment device in the flow path of a process water containing residues of a polymer melt and on which at least one item of component-specific information is stored,
b) providing at least one respective control parameter for the water treatment device in accordance with the component-specific information, wherein the control parameter is one of the following:
a rotary speed,
a speed,
a temperature,
a conveyor volume flow,
a pressure,
a power output,
a predefined value for initiating a flushing or cleaning operation, and
a predefined value for initiating a maintenance operation,
c) executing a plurality of diagnostic processes based on the monitored component-specific information in order thereby to monitor operation of the water treatment device and to provide at least one of the following items of information:
the time of the next maintenance of the water treatment device,
the remaining service life of at least one component in the flow path of the polymer melt,
a warning indication that faults were found in operation of the water treatment device, and
d) repetition of steps a) to c) after each exchange of a component from the flow path of the polymer melt.

Preferred embodiments and advantages of the method according to the invention of controlling a pelletizing apparatus are at the same time preferred embodiments and advantages of the method of controlling a water treatment device for such a pelletizing apparatus.

BRIEF DESCRIPTION OF THE DRAWINGS

Preferred embodiments of the invention are described hereinafter with reference to the accompanying Figures in which.

DETAILED DESCRIPTION OF ILLUSTRATIVE EMBODIMENTS

Figure 1:
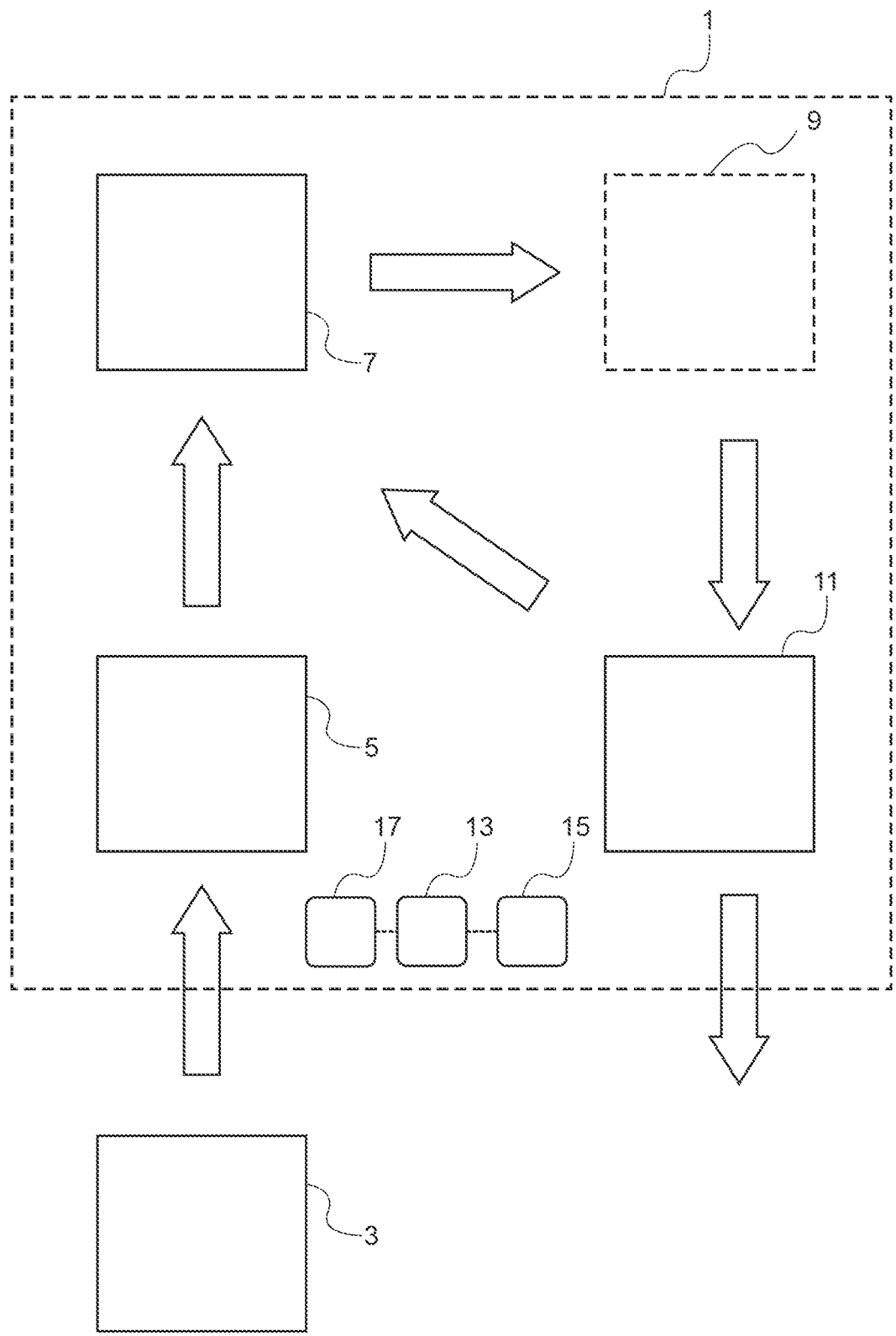
FIG. 1 shows a diagrammatic view of a pelletizing apparatus.

FIG. 1 shows a pelletizing apparatus 1 having a filter device 5 which can be connected in fluid-conducting relationship to a melt feed 3.

In this embodiment the melt feed 3 is a component part of a melting apparatus 3.

The filter device 5 is adapted to filter the polymer which is liquefied by the melting apparatus 3 and in particular to remove contaminating impurities and residues of filling material from the molten polymers.

The filter device 5 is connected in fluid-conducting relationship to a downstream-disposed underwater granulator 7. The underwater granulator 7 is adapted to divide the filtered polymer melt provided by the filter device 5 into individual polymer strands and sever them into individual strand portions which are then removed in the form of pellets or granules.

The pellets can preferably be fed to a downstream-connected drying device 9 which can preferably also be part of the pelletizing apparatus 1 and which is adapted to reduce the water content in the pellets and to promote crystallization of the preferably thermoplastic polymer pellets, in particular by the action of temperature.

The pelletizing apparatus 1 further includes a water treatment device 11. The excess process water from the drying device 9 and/or from the underwater granulator 7 is then cleaned of residues of the polymer melt by the water treatment device 11 and prepared again for the process, preferably the underwater granulator 7.

The pelletizing apparatus 1 further includes a control means 13 adapted to control the melting apparatus 3 and/or the filter device 5 and/or the underwater granulator 7 and/or the water treatment device 11 and to provide at least one control parameter.

The control parameters in that case can be for example a rotary speed, a speed, a temperature, a conveyor volume flow, a pressure or a power output.

In addition, the pelletizing apparatus 1 includes a reading device 15 adapted to read out component-specific information from an identification means (not shown) which is associated with a component in the flow path of the polymer melt and/or the process water.

The pelletizing apparatus 1 further includes a writing device 17 adapted to write and/or overwrite the identification means (not shown) with the component-specific information.

Figure 2:
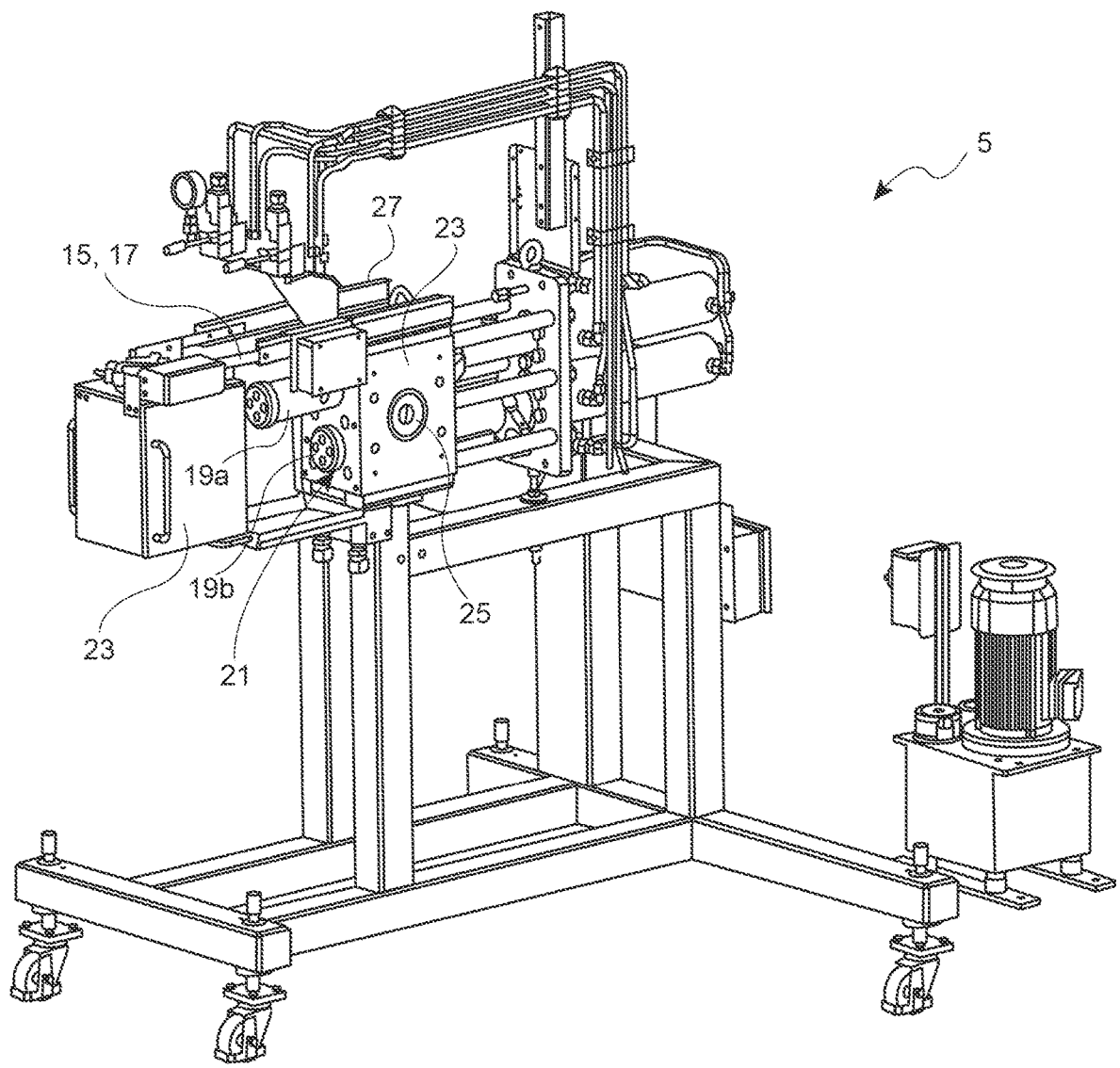
FIG. 2 shows a filter device for a pelletizing apparatus according to FIG. 1 in a first preferred embodiment.

FIG. 2 shows the filter device 5 which can be connected in fluid-conducting relationship to the melting apparatus 3 (see FIG. 1).

In the embodiment of FIG. 2 the filter device 5 is in the form of a sieve changer. The sieve changer 5 has a filter housing 23 in which two filter elements 19a, b, so-called sieve carriers having a sieve, are displaceably arranged. In that case the filter housing 23 has a housing inlet 27 and a housing outlet 25 through which a flow passage is created.

The underwater granulator 7 (see FIG. 1) can be connected in fluid-conducting relationship to the filter housing 23 of the sieve changer 5, wherein the polymer melts which is liquefied by the melting apparatus 3 is firstly passed into the housing inlet 27 of the filter housing 23, then through the filter element 19 and finally through the housing outlet 25.

When the sieve changer 5, as in the present case, has two sieve carriers each having a respective sieve 19a, b a contaminated sieve can be moved out of the flow passage. In that position the contaminated sieve is in a change position in which it is accessible and can be cleaned or can be replaced by an unused or previously cleaned sieve. The other sieve can then be moved into the change position and replaced.

Fixed to the sieve carriers having the sieves 19a, b is an identification means 21 which stores and provides component-specific information relating to the degree of filter fineness and/or the maximum service life and/or the structural configuration and/or article number and/or drawing number and/or serial number and/or material identification of the sieves 19a,b. The foregoing list is only given by way of example and is not to be deemed definitive. The component-specific information stored on the identification means 21 can be read by the reading device magnetically, by way of infrared or radio.

The sieve changer 5 is connected in signal-conducting relationship to a control means (not shown). The control means is adapted to provide at least one control parameter for controlling the sieve changer 5, in which case, in this embodiment, the control parameter is a conveyor volume flow or a pressure.

The control means is connected to a combined reading and writing device 15, 17 adapted to receive and/or overwrite or supplement the component-specific information from the identification means 21.

The control means is adapted to adapt at least one of the above-mentioned control parameters in dependence on the component-specific information, to provide the component-specific information and in particular based on the component-specific information to perform a diagnostic process and/or produce a warning message.

Such a warning message or the result of the diagnostic process can include for example a recommendation to carry out a cleaning operation and/or a maintenance operation and/or replacement of the component provided with the identification means and/or a cooperating component of the filter device 5.

Figure 3:
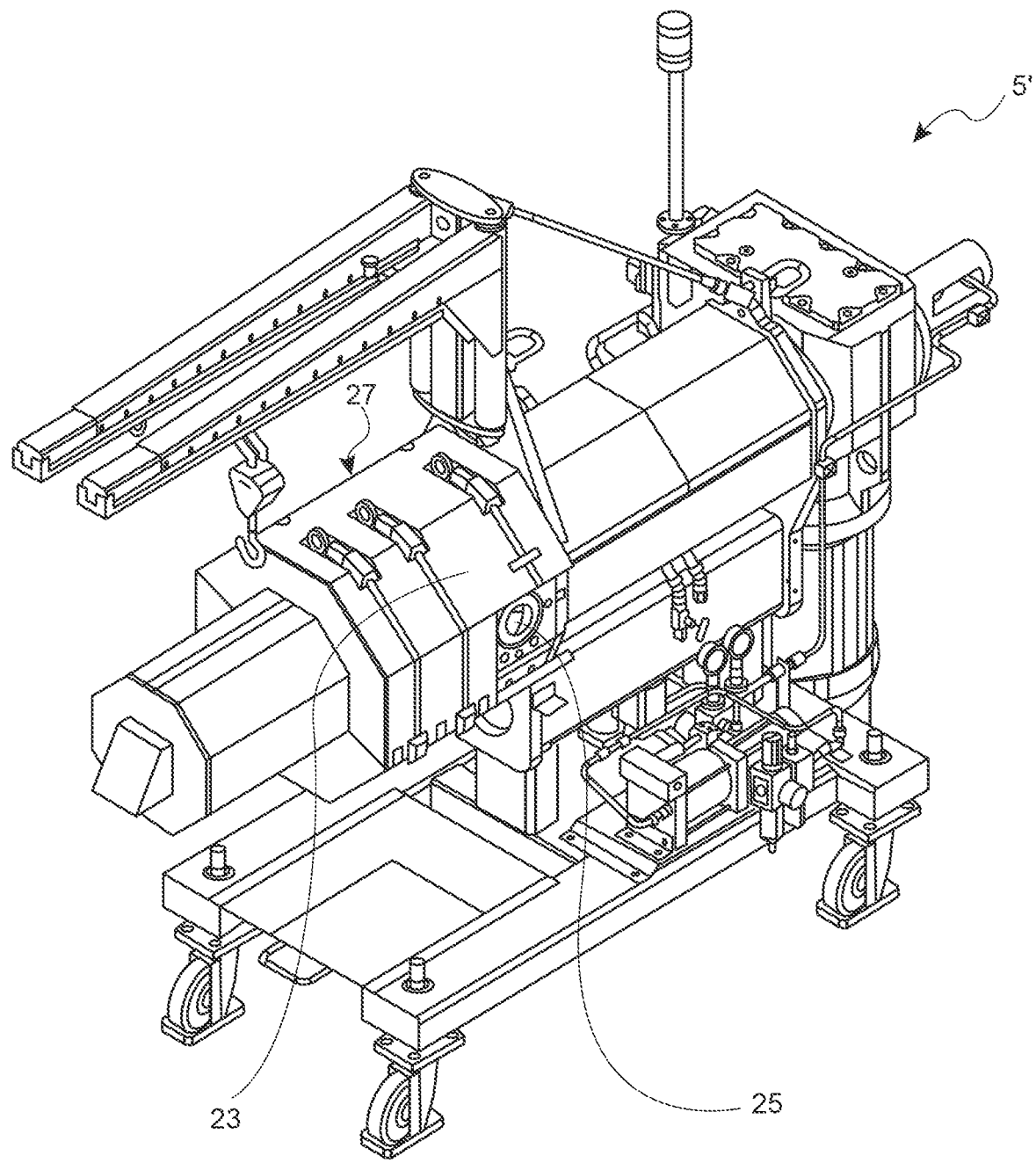
FIG. 3 shows a filter device for a pelletizing apparatus according to FIG. 2 in a second preferred embodiment.

FIG. 3 shows a perspective view of a filter device 5' for the removal of dirt particles from a polymer melt, having a filter housing 23' with a filter chamber.

Figure 4:
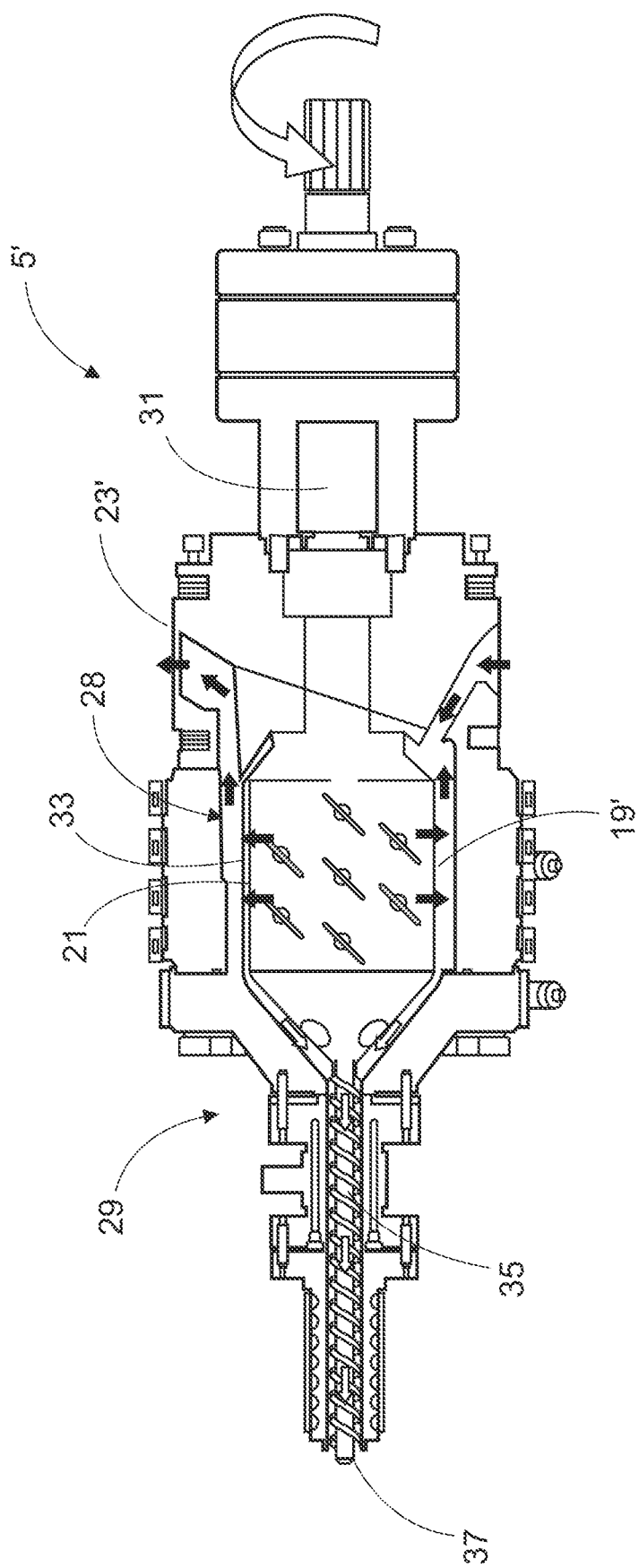
FIG. 4 shows a sectional view of the filter device of FIG. 3.

As the sectional view of the filter device 5' in FIG. 4 in particular shows the filter housing 23' has a housing inlet (not shown in greater detail) for introducing the polymer melt to be cleaned into the filter chamber and an outlet (not shown) for passing the cleaned polymer melt out of the filter chamber. In addition, the filter housing 23' has a dirt outlet 37 through which dirt particles filtered out of the polymer melt can be discharged from the filter housing 23'. Arranged in the filter housing 23' or the filter chamber is a filter element 19' for filtering dirt particles out of the polymer melt, through which the polymer melt can be passed.

The filter element 19' has a "dirt side" 28 at which the dirt particles accumulate or at which the dirt particles are retained and a "clean side" 29 at which the cleaned polymer melt flows away.

The filter device 5' also has a cleaning device 29 (not shown in greater detail) for cleaning the filter element 19' of dirt particles retained on the dirt side 28 from the polymer melt. The cleaning device 29 preferably includes a cleaning head having a plurality of scraper bodies for detaching dirt particles which have collected at the filter element 19' and preferably passing the dirt particles in the direction of the dirt outlet 37.

The cleaning device 29 includes a shaft 31 operatively connected to a drive (not shown).

As FIG. 4 further shows disposed in the region of the dirt outlet 37 is a dirt discharge screw 35 which is associated with the cleaning device 29 and is coupled to the shaft 31. The dirt particles removed by the cleaning device 29 at the filter element 19' are discharged or removed from the filter chamber by means of the dirt discharge screw 35.

Fixed to the filter element 19' is an identification means 21 which stores and provides component-specific information relating to the degree of filter fineness and/or the maximum service life and/or the structural configuration and/or article number and/or drawing number and/or serial number and/or material identification of the filter basket. The foregoing listing is only by way of example and is not to be interpreted definitively. The component-specific information stored on the identification means 21 can be read and/or written or overwritten magnetically, by way of infrared or radio.

The filter device 5' is connected in signal-conducting relationship to a control means (not shown). The control means is adapted to provide at least one control parameter for control of the filter device 5', wherein in this embodiment the control parameter is a rotary speed, a speed, a temperature, a conveyor volume flow or a pressure.

The control means is connected to a combined reading and writing device 16, 17 adapted to receive the component-specific information from the identification means 21 and/or overwrite or supplement same.

The control means can also be a control portion of the control means 13 (see FIG. 1).

The control means is adapted to adapt at least one of the above-mentioned control parameters in dependence on the component-specific information, to provide the component-specific information and in particular based on that information to carry out a diagnostic process and/or to produce a warning message.

Such a warning message or the result of the diagnostic process can for example include a recommendation to carry out a cleaning operation and/or a maintenance operation and/or replacement of the component provided with the identification means and/or a cooperating component of the filter device 5'.

Figure 5:
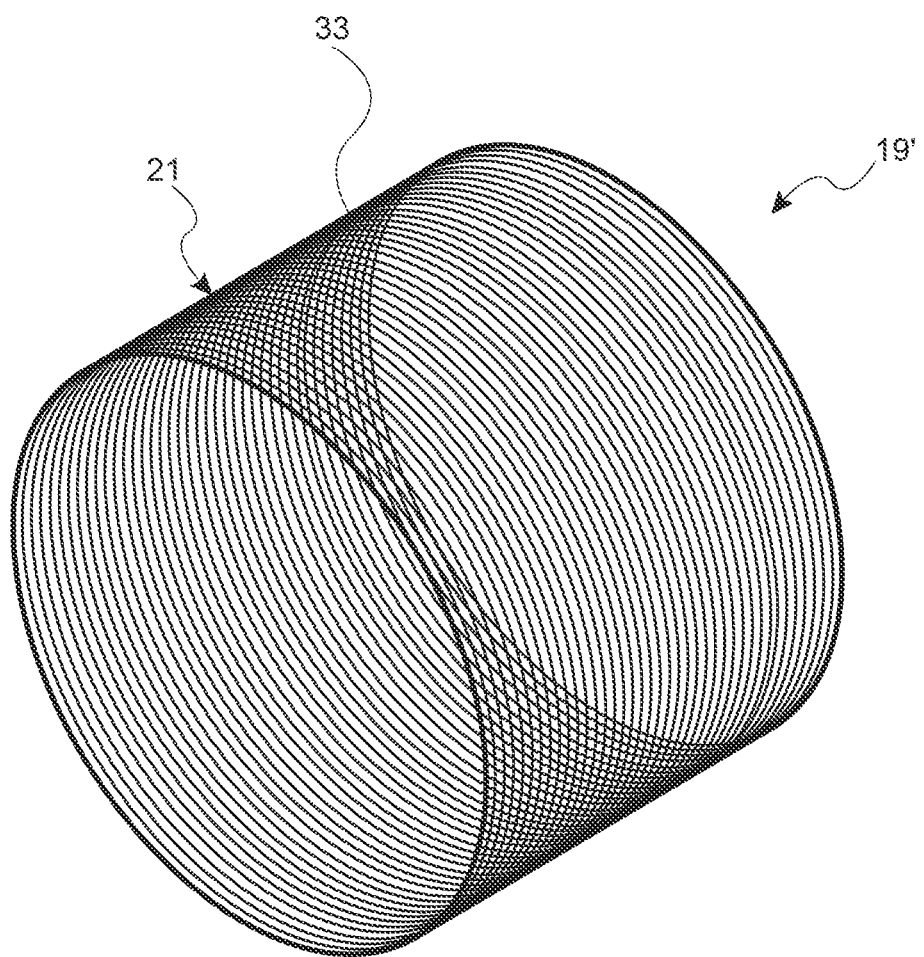
FIG. 5 shows a filter element for the filter device of FIG. 3.

FIG. 5 shows the filter element 19' in detail. The filter element 19' is in the form of a cylindrical filter basket having a peripheral surface 33. Fixed to the peripheral surface is the identification means 21 which, as already described in relation to FIG. 1, has component-specific information.

Figure 6:
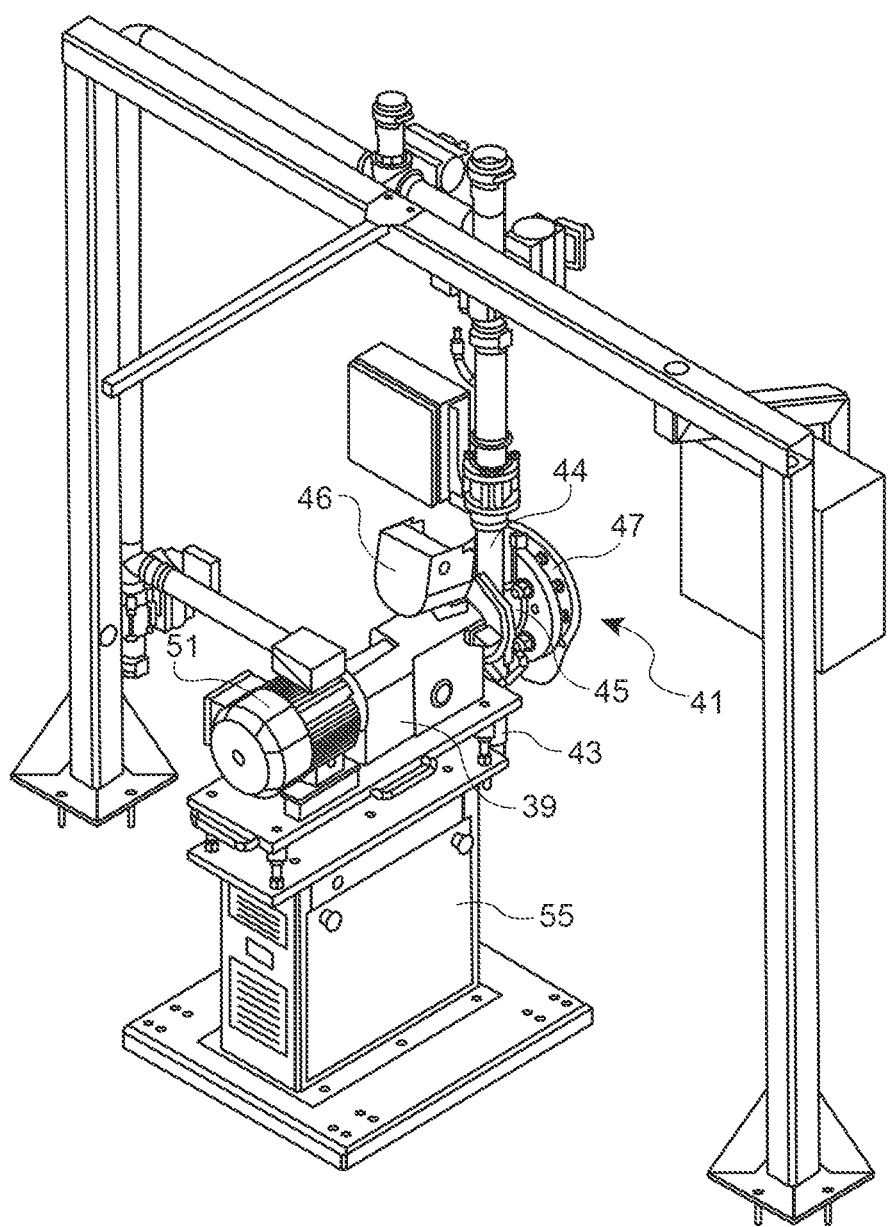
FIG. 6 shows an underwater granulator for a pelletizing apparatus according to FIG. 1.
Figure 7:
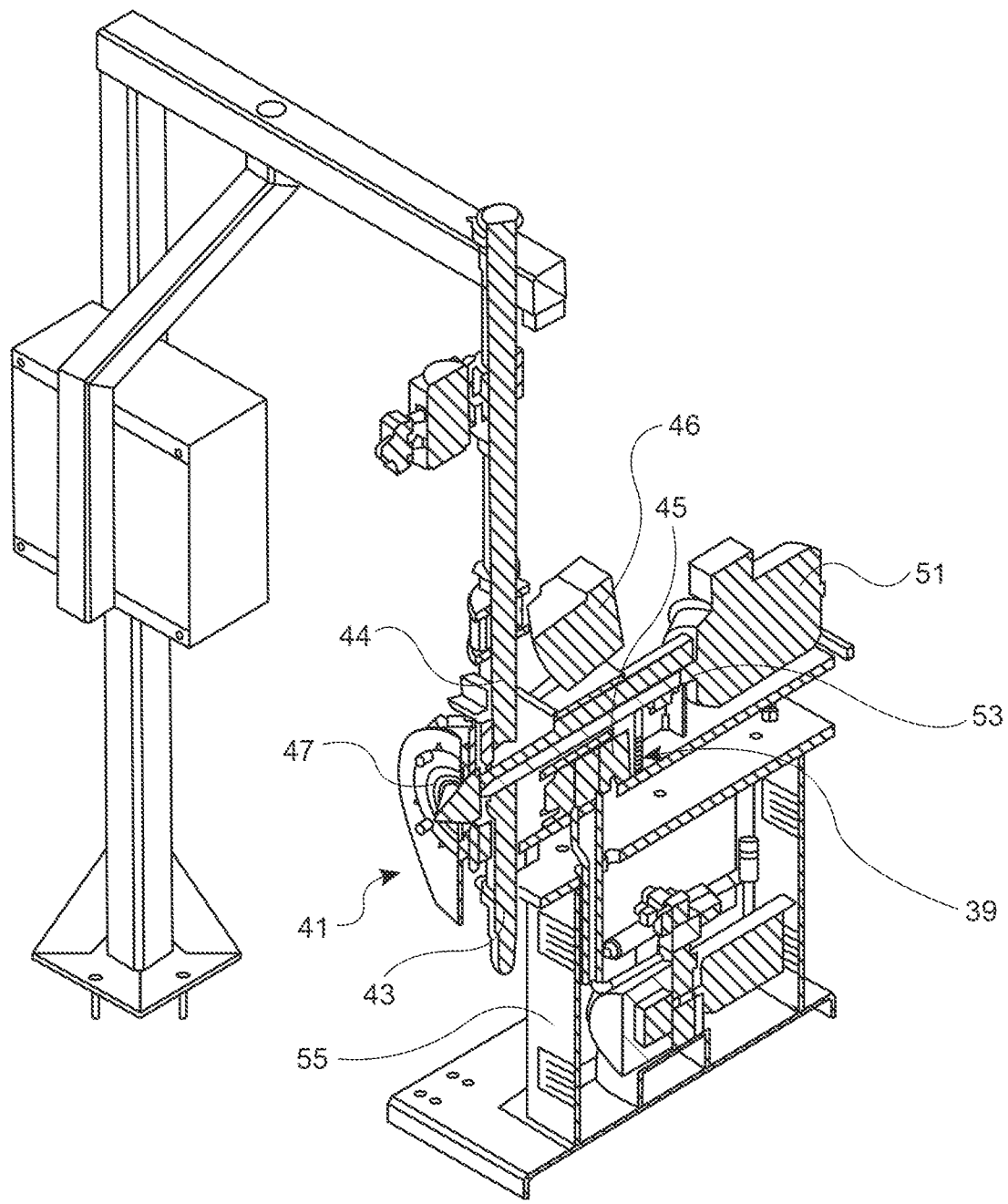
FIG. 7 shows a perspective partly sectional view of an underwater granulator as shown in FIG. 6.
Figure 8:
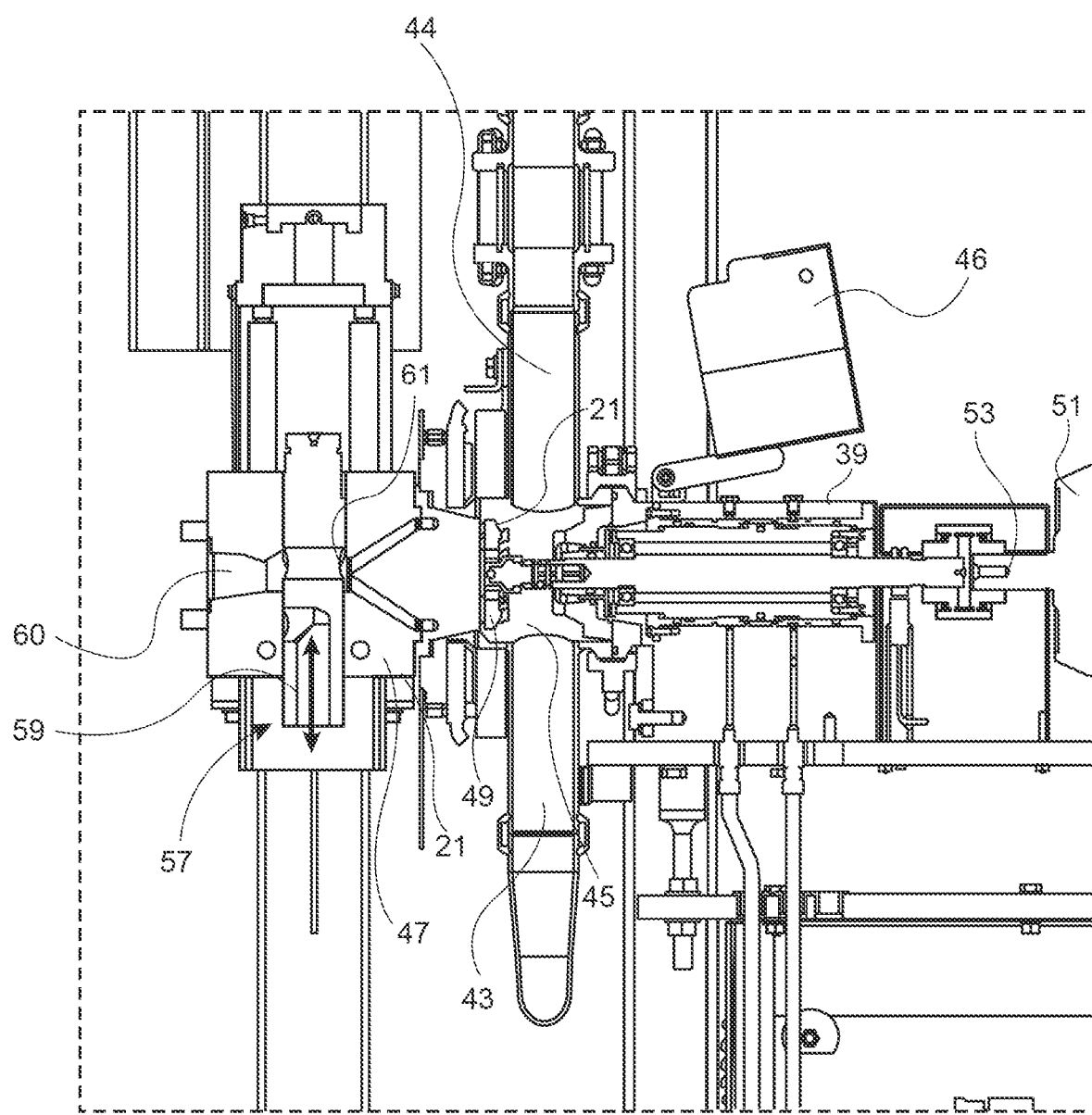
FIG. 8 shows a sectional view of a portion of an underwater granulator as shown in FIG. 6.
Figure 9:
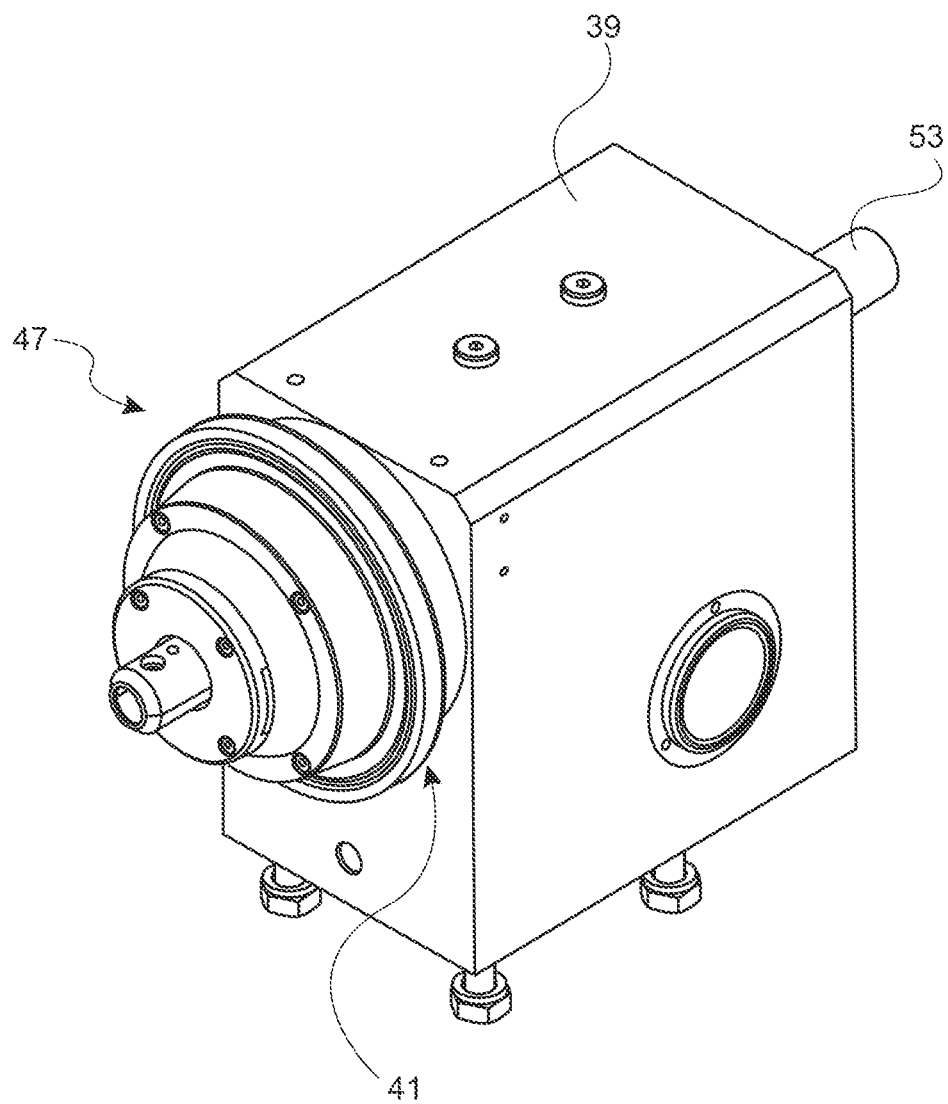
FIG. 9 shows a housing of the underwater granulator as shown in FIG. 6.

FIGS. 6 to 8 show a granulator 7 which in the present case and preferably is in the form of an underwater granulator. The granulator 7 has a granulator housing 39 (see also FIG. 9) having a housing inlet 41 for the feed of polymer melt and a housing outlet (not shown) for the discharge of pellets or granules. The granulator 7 further has a blade protection 46.

In addition, the granulator 7 has a cooling chamber 45, an apertured plate 47, a blade head 49 as well as a drive 51 which provides a drive power output.

In operation the polymer melt issues from the blade head 49 (see FIGS. 7, 8, 14*a*, 14*b*) in the form of polymer strands (not shown), divided into strand portions.

The strand portions pass into the cooling chamber 45 in contact with a cooling fluid, in particular water, and are abruptly cooled down. The polymer strands are cut and form strand portions which in the course of the further procedure are removed from the water in the form of granules or pellets and are discharged through the housing outlet (not shown).

The drive 51 serves in particular for driving the blade head 49 adapted to cut the polymer strands into strand portions. The blade head 49 is rotatably mounted on an entrainment member 72 (see FIGS. 15*a*, 15*b*) and is connected by means thereof to a drive shaft 53 and the drive 51.

The assembly comprising drive 51, cooling chamber 45 as well as blade head 49 and apertured plate 47 is arranged on a machine carrier 55 having for example rollers for simplified positionability of the granulator 7.

The granulator 7 includes at least one identification means 21 for storing and providing at least one item of component-specific information. In that respect, preferably a respective identification means 21 is associated with the apertured plate 47 and the blade head 49 and is adapted to store at least one item of component-specific information of the blade head 49 or the apertured plate 47.

The item or items of component-specific information include an article number and/or a drawing number or a serial number and/or a material identification of the respective component and/or the structural size or dimensions and/or the structural shape and/or a composition and/or layer thickness of the wearing layer and/or an embodiment of series products and/or a maximum power output and/or a coefficient of friction or surface quality.

The granulator 7 is connected in signal-conducting relationship to a control means adapted to provide at least one control parameter, in particular a rotary speed, a speed, a throughput amount, a conveyor volume flow or a pressure.

The control means can also be a control portion of the control means 13 (see FIG. 1).

The control means is connected to a combined reading and writing device 15, 17 adapted to receive the component-specific information from the identification means 21 and/or to overwrite or supplement same.

The control means is adapted to adapt at least one of the above-mentioned control parameters in dependence on the component-specific information, to provide the component-specific information and in particular based on that information to carry out a diagnostic process and/or produce a warning message.

Such a warning message or the result of the diagnostic process can include for example a recommendation to carry out a cleaning operation and/or a maintenance operation and/or replacement of the component provided with the identification means and/or a cooperating component of the granulator 7.

Figure 10:
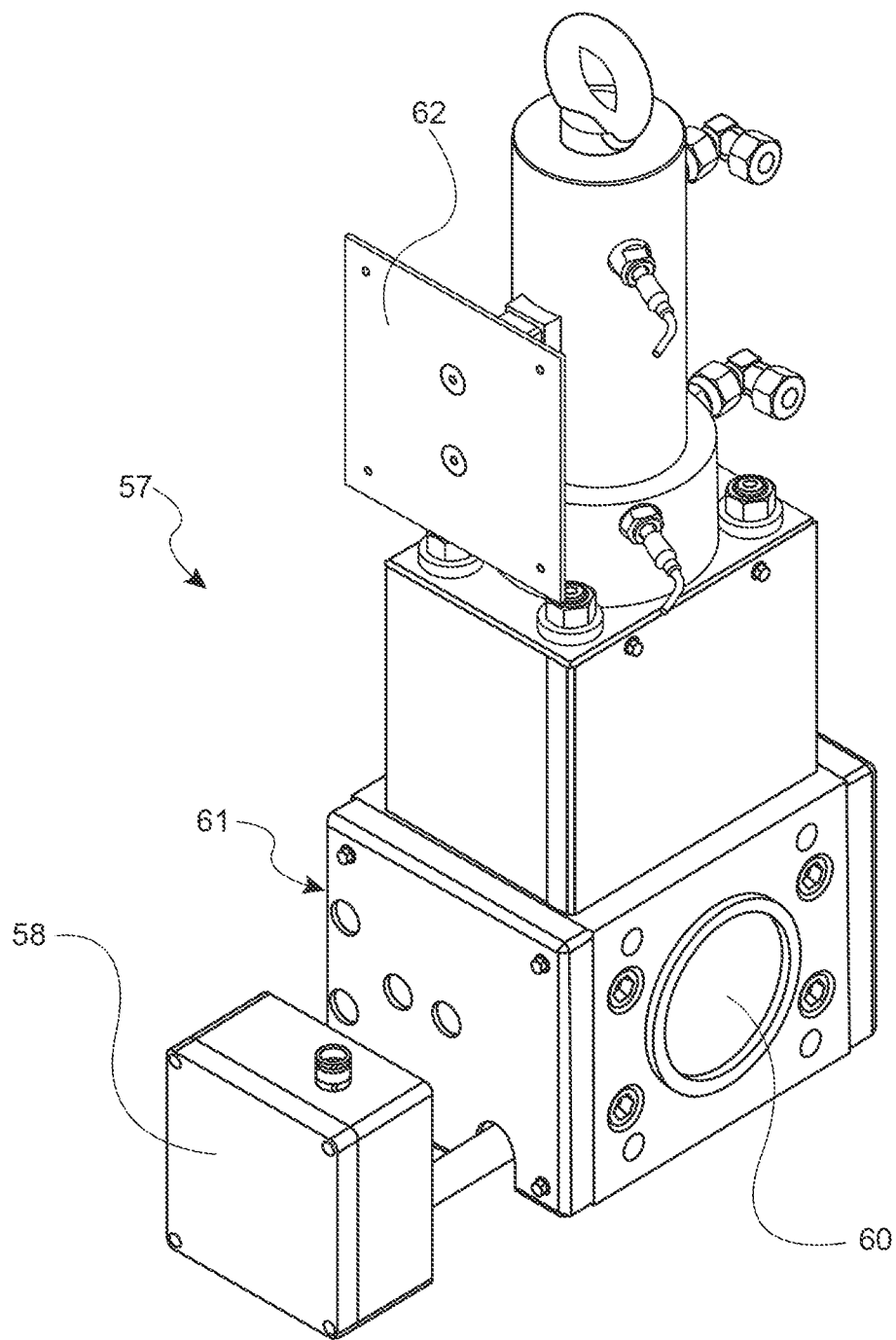
FIG. 10 shows a start-up valve for an underwater granulator as shown in FIG. 6.

The start-up valve 57 shown in FIGS. 8 and 10 includes a valve housing 59, at the outside of which there is a valve inlet 60 for fluid-conducting connection to the melting apparatus 3 (see FIG. 1) and a valve outlet 61 for fluid-conducting connection to the granulator 7, wherein the valve inlet 60 and the valve outlet 61 in the illustrated embodiment are advantageously disposed on opposite sides of the valve housing 59 and are in fluid communication. In order to fluid-tightly separate the valve inlet 60 and the valve outlet 61 from each other a valve body is accommodated in the valve housing 59 moveably along its longitudinal axis. The valve housing 59 could also be referred to as a valve spool.

Advantageously the valve body 59 can be reciprocated in known manner between its various valve positions by means of an actuator 58.

The start-up valve 57 preferably has a mounting accessory portion 62 for coupling to the granulator 7 and/or a carrier structure.

The start-up valve 57 preferably has an identification means 21 mounted to the valve housing 59. The identification means 21 is adapted to store at least one item of component-specific information of the start-up valve 57 and to provide it for the combined reading and writing device 15, 17 (see FIG. 6) connected to the control means of the granulator 7 or to the reading device 15 and the writing device 17 (see FIG. 1) connected to the control means 13 of the pelletizing apparatus 1.

The item or items of component-specific information include an article number and/or a drawing number or a serial number and/or a material identification of the respective component and/or the structural size or dimensions and/or the structural shape and/or a composition and/or a reaction or closure time and/or an embodiment of series products and/or a maximum power output and/or a coefficient of friction or a surface quality.

The reading and writing device 15, 17 is adapted in known manner to receive the component-specific information from the identification means 21 on the valve housing and/or to overwrite or supplement same.

The control means 13 or the control means of the granulator is adapted to adapt at least one control parameter, in the present case a speed, in particular a closing speed, or a conveyor volume flow of the granulator 7, in dependence on the component-specific information, to provide the component-specific information and in particular based on that information to perform a diagnostic process and/or provide a warning message.

Such a warning message or the result of the diagnostic process can include for example a recommendation to carry out a cleaning operation and/or a maintenance operation and/or replacement of the component provided with the identification means and/or a cooperating component of the start-up valve.

Figure 11A:
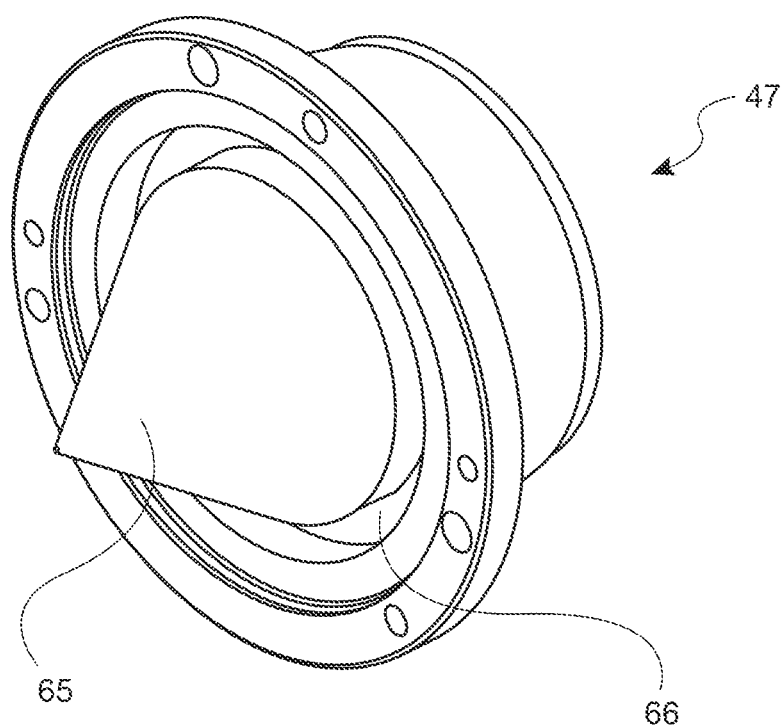
FIG. 11a shows an apertured plate for an underwater granulator as shown in FIG. 6 in a first perspective view according to a first preferred embodiment.
Figure 11B:
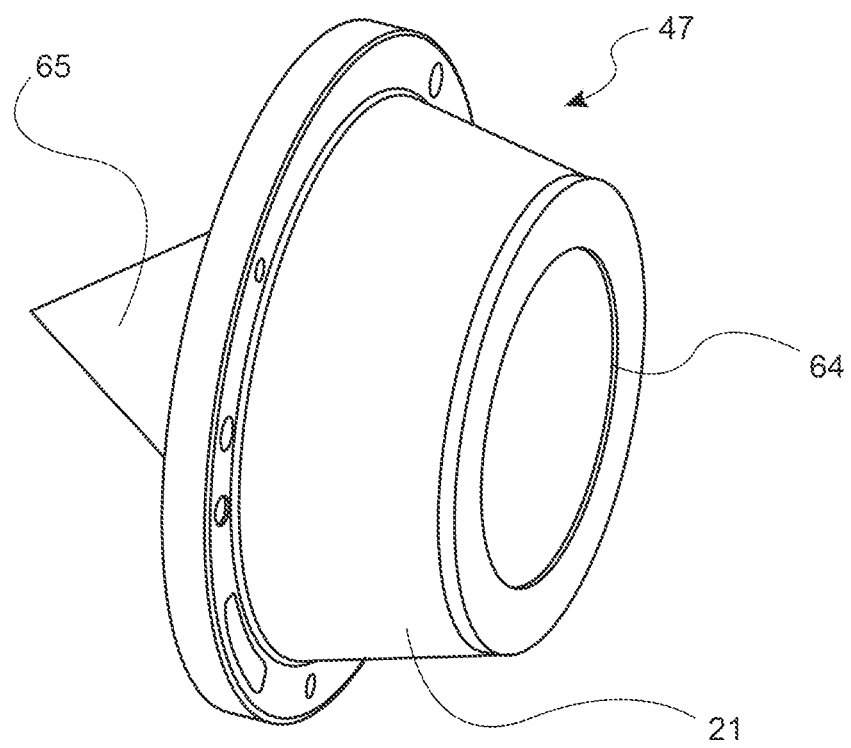
FIG. 11b shows the apertured plate of FIG. 11a in a second perspective view.
Figure 13:
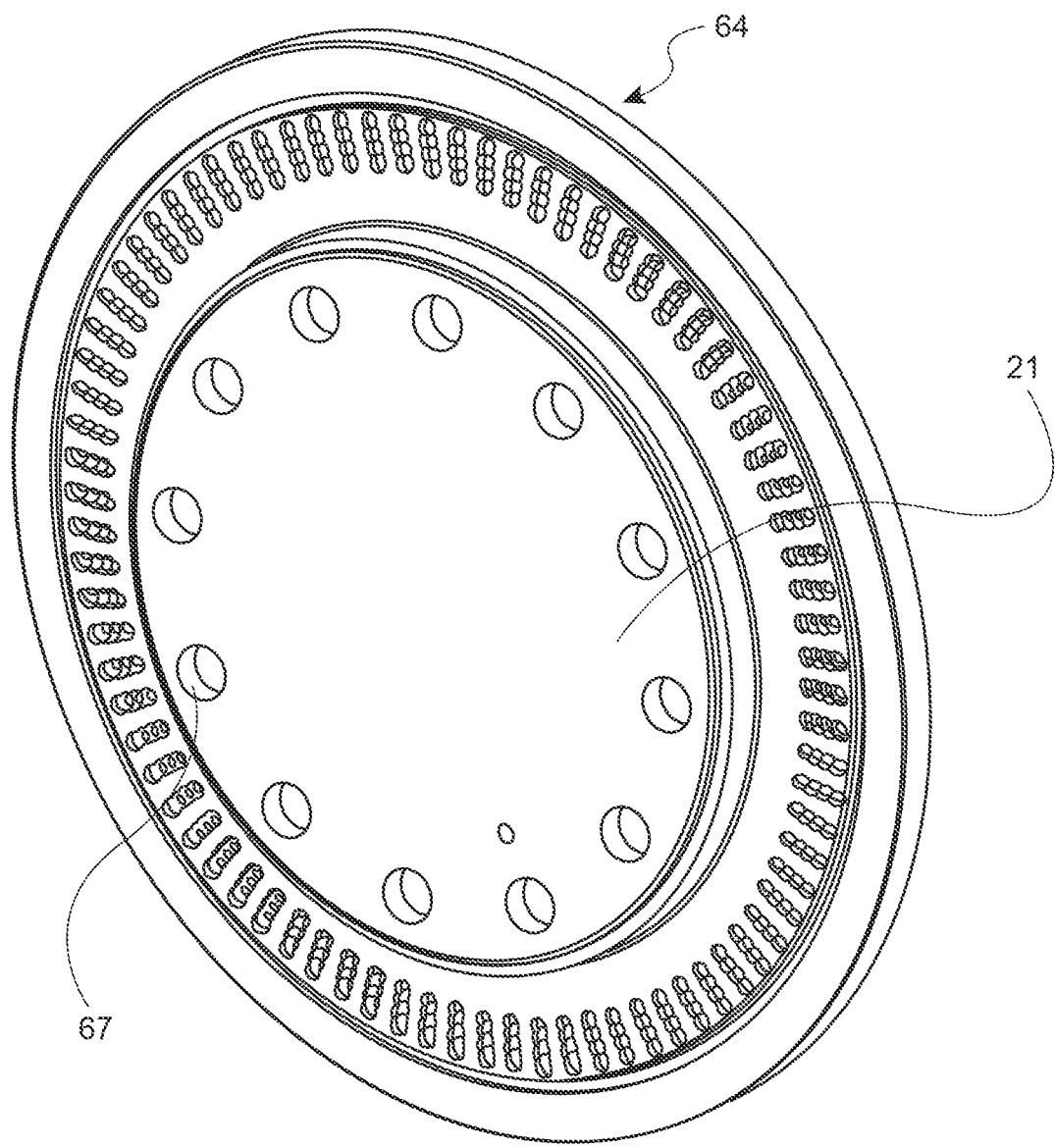
FIG. 13 shows a cutting plate for an apertured plate as shown in FIGS. 12a and 12b in a perspective view.

FIGS. 11a and 11b show the apertured plate 47 which in this embodiment is of a multi-part structure in the configuration of an electrically heatable heating flange 63 with a replaceable cutting plate 64 (not shown, see FIG. 13). To receive the cutting plate 64 the heating flange 63 has a cutting plate receiving means 64a.

The polymer melt is initially divided into a plurality of partial flows on the entry side of the heating flange 63 by means of a cone 65. The partial flows pass through passages 66 to the outlet holes 67 shown in FIG. 13 in the cutting plate 64.

In the present case a respective identification means 21 is mounted to the heating flange 63, in particular the periphery of the heating flange 63 and the cutting plate 64.

Figure 12A:
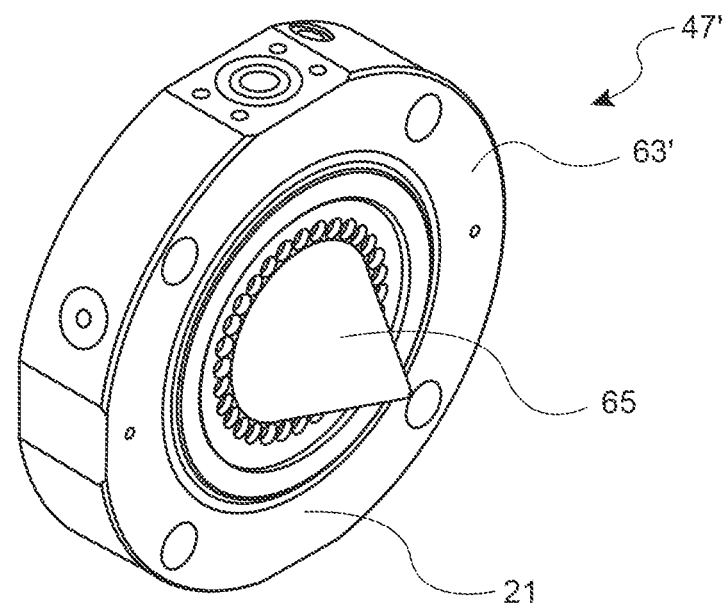
FIG. 12a shows an apertured plate for an underwater granulator as shown in FIG. 6 in a second preferred embodiment as a perspective view.
Figure 12B:
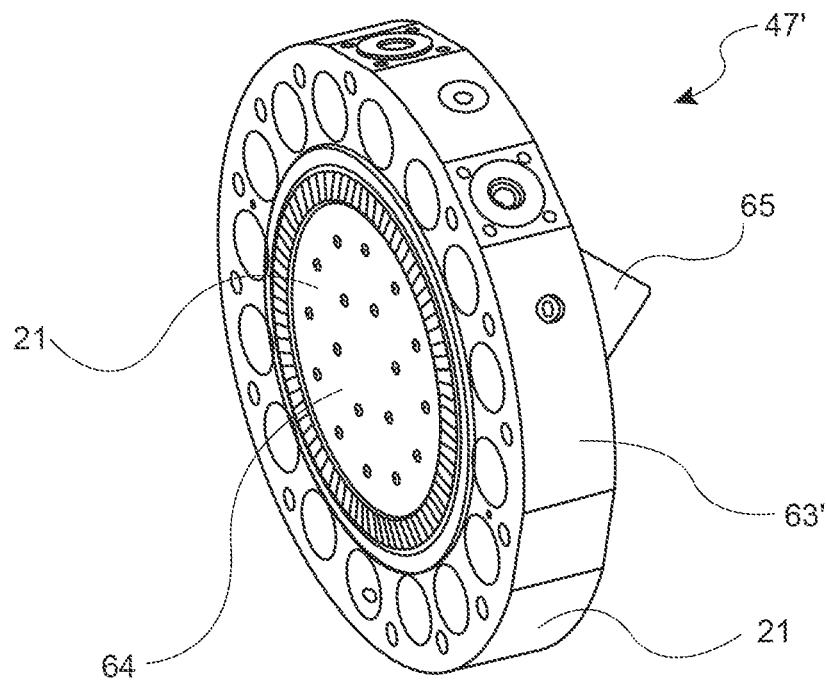
FIG. 12b shows the apertured plate of FIG. 12a in a second perspective view.

FIGS. 12a and 12b show the apertured plate 47' which in this embodiment is of a multi-part structure in the form of an oil-heatable heating flange 63' with a replaceable cutting plate 64. The heating flange 63' has a plurality of oil connections for the supply of heated oil and heating passages, through which the oil can be distributed in the heating flange 63'. The rest of the configuration of the heating flange 63' does not differ from the embodiment shown in FIGS. 11a and 11b.

In the present case a respective identification means 21 is mounted to the heating flange 63', in particular the periphery of the heating flange 63' and the cutting plate 64.

The cutting plate 64 shown in FIG. 13 has outlet holes 67 which are arranged in a circle and through which plastic melt issues into the cooling chamber 45 (see FIG. 7), in this embodiment 16 uniformly distributed outlet holes 67. The blade head (see FIGS. 14a, 14b) rotates on the cutting plate 64 to sever the polymer strands issuing from the outlet openings. The cutting plate 64 is therefore preferably formed from a material which is as wear-resistant and media-resistant as possible, like for example stainless steel.

The identification means 21 is preferably arranged at the outlet side of the cutting plate 64 so that the polymer strands extend laterally along the identification means 21 and the polymer melt does not meet the identification means 21.

Figure 14A:
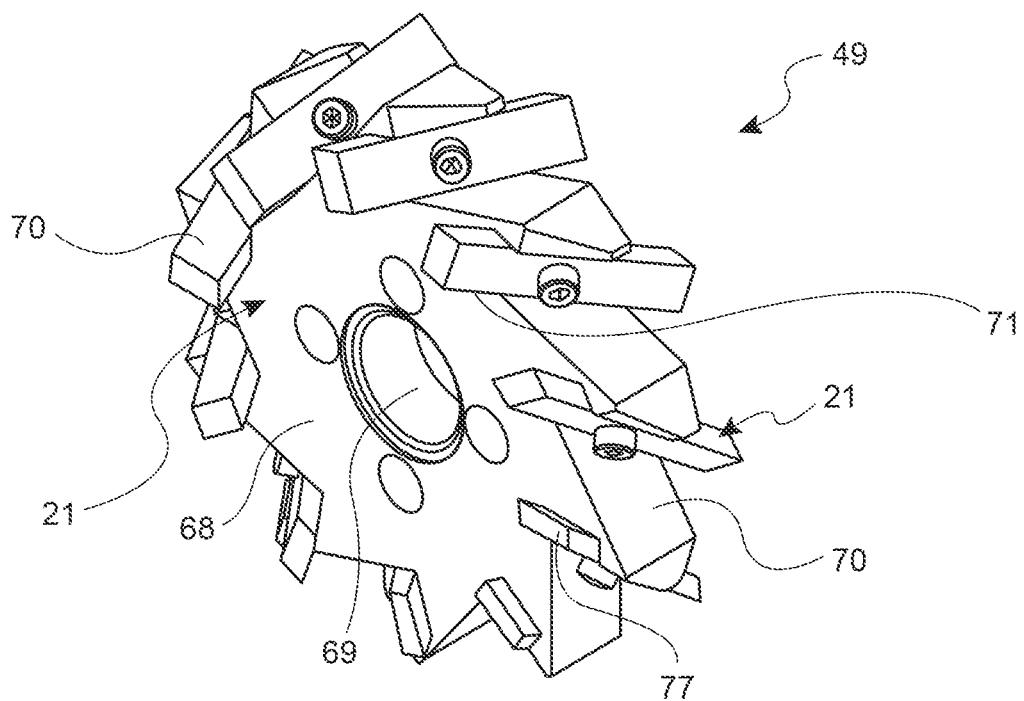
FIG. 14a shows a blade head for an underwater granulator as shown in FIG. 6 in a first perspective view.
Figure 14B:
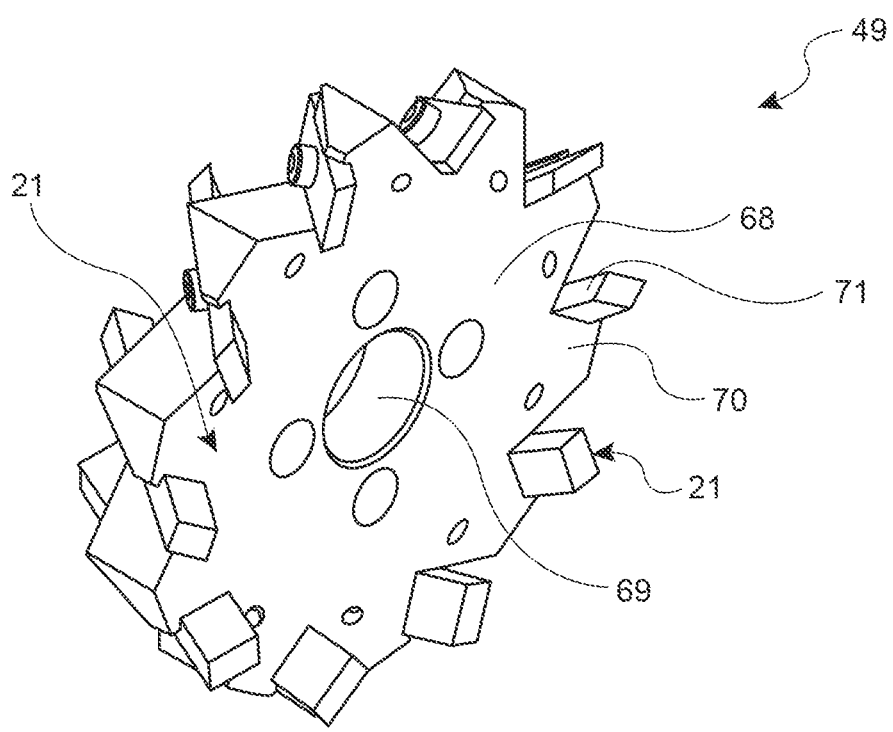
FIG. 14b shows the blade head of FIG. 14a in a second perspective view.

FIGS. 14a and 14b show the blade head 49 which can be mounted to the shaft 53 (see FIG. 7) and which has a gear-like main body 48.

The main body 48 has a central bore 69 into which the drive shaft 53 (see FIG. 7) can be fitted. By means of an entrainment member 72 (see FIGS. 15a, 15b) the main body 48 can then be mounted rotatably on the drive shaft 53 at a defined position along the longitudinal axis of the drive shaft 53.

The outer periphery of the main body 48 is adjoined by a plurality of blade holding arms 70 which taper outwardly similarly to the flanks of a tooth on a toothed gear, but in this case the blade holding arms 70 do not extend precisely radially outwardly but are preferably set at an angle, in particular less than 60 degrees, relative to the radius or diameter, in which respect other angles are also possible. A plurality of blades or blade elements 71 with a cutting edge are arranged at the blade holding arms 70.

The inclined positioning of the blade holding arms 70 in relation to the diameter means that a cutting edge on the blade element 71 performs a pulling cut when it meets one of the polymer strands issuing at the apertured plate 47 (see FIGS. 11 to 13).

As the blade elements 71 brush directly along the apertured plate 47 (see FIGS. 11 to 13) they are preferably made from a hard material. Further preferably individual blade elements 71 are replaceably coupled to the blade holding arms 70.

By way of example the blade elements can also be in the form of simple striker bars and are therefore neither whetted nor ground to a point.

In the present case a respective identification means 21 is arranged at a surface of the main body 48, that extends in orthogonal relationship with the longitudinal axis. In addition, thereto a further identification means 21 is preferably mounted to the blade 71 spaced in relation to the cutting edge.

Figure 15A:
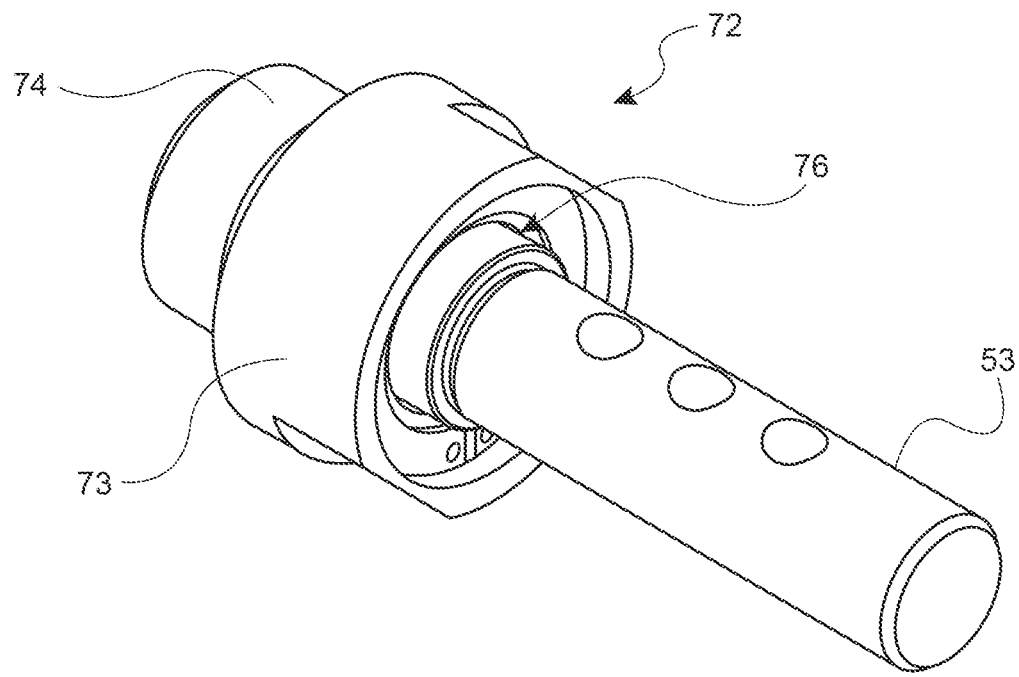
FIG. 15a shows an entrainment member for a blade head in a first perspective view.
Figure 15B:
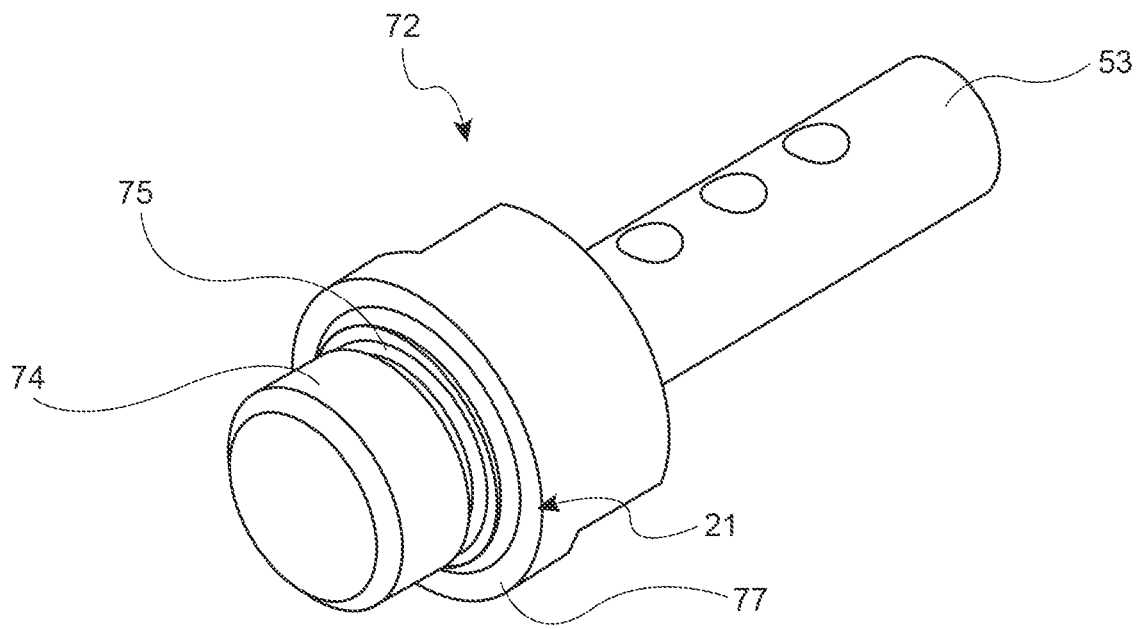
FIG. 15b shows the blade head of FIG. 15a in a second perspective view.

FIGS. 15a and 15b show an entrainment member 72 coupled to the drive shaft 53 for the blade head (see FIGS. 14a, 14b). The entrainment member 72 has a part-cylindrical support portion 73 which at its distal end remote from the drive 51 in the installed state (see FIG. 5) has a mounting interface 75 with a corresponding mounting means 74. The mounting interface 75 is preferably in the form of a male thread and the mounting means 74 is in the form of a cap having a female thread, the cap being adapted to come into engagement with the male thread 75 in such a way that the blade head 49 can be accommodated and in particular clamped fast between the cap and a contact surface 77 of the support portion 73.

The support portion 73 is preferably in the form of a cowl and is mounted with a coupling ring 76 on the drive shaft 53 by means of a ball joint (not shown).

Preferably the identification means 21 is fixed to the support portion 73 and is adapted to provide component-specific information of the entrainment member 72. The identification means 21 is adapted to store at least one item of component-specific information of the entrainment members 72 and to provide it to the combined reading and writing device 15, 17 (see FIG. 6) connected to the control means of the granulator 7 or to the reading device 15 and writing device 17 (see FIG. 1) connected to the control means 13 of the pelletizing apparatus 1.

The item or items of component-specific information include an article number and/or a drawing number or a serial number and/or a material identification of the respective component and/or the structural size or dimensions and/or the structural shape and/or a composition and/or layer thickness of the wearing layer and/or an embodiment of series products and/or a maximum power and/or a coefficient of friction or a surface quality.

The reading and writing device 15, 17 is adapted in known manner to receive the component-specific information from the identification means 21 on the valve housing and/or to overwrite or supplement same.

The control means 13 or the control means of the granulator is adapted to adapt at least one control parameter, in the present case a speed, in particular a rotary speed of the blade head 49 or a conveyor volume flow of the granulator 7 in dependence on the component-specific information, to provide the component-specific information and in particular based on the component-specific information to carry out a diagnostic process and/or produce a warning message.

Such a warning message or the result of the diagnostic process can include for example a recommendation to carry out a cleaning operation and/or a maintenance operation and/or replacement of the component provided with the identification means 21 and/or a cooperating component of the entrainment member 72.

Figure 16:
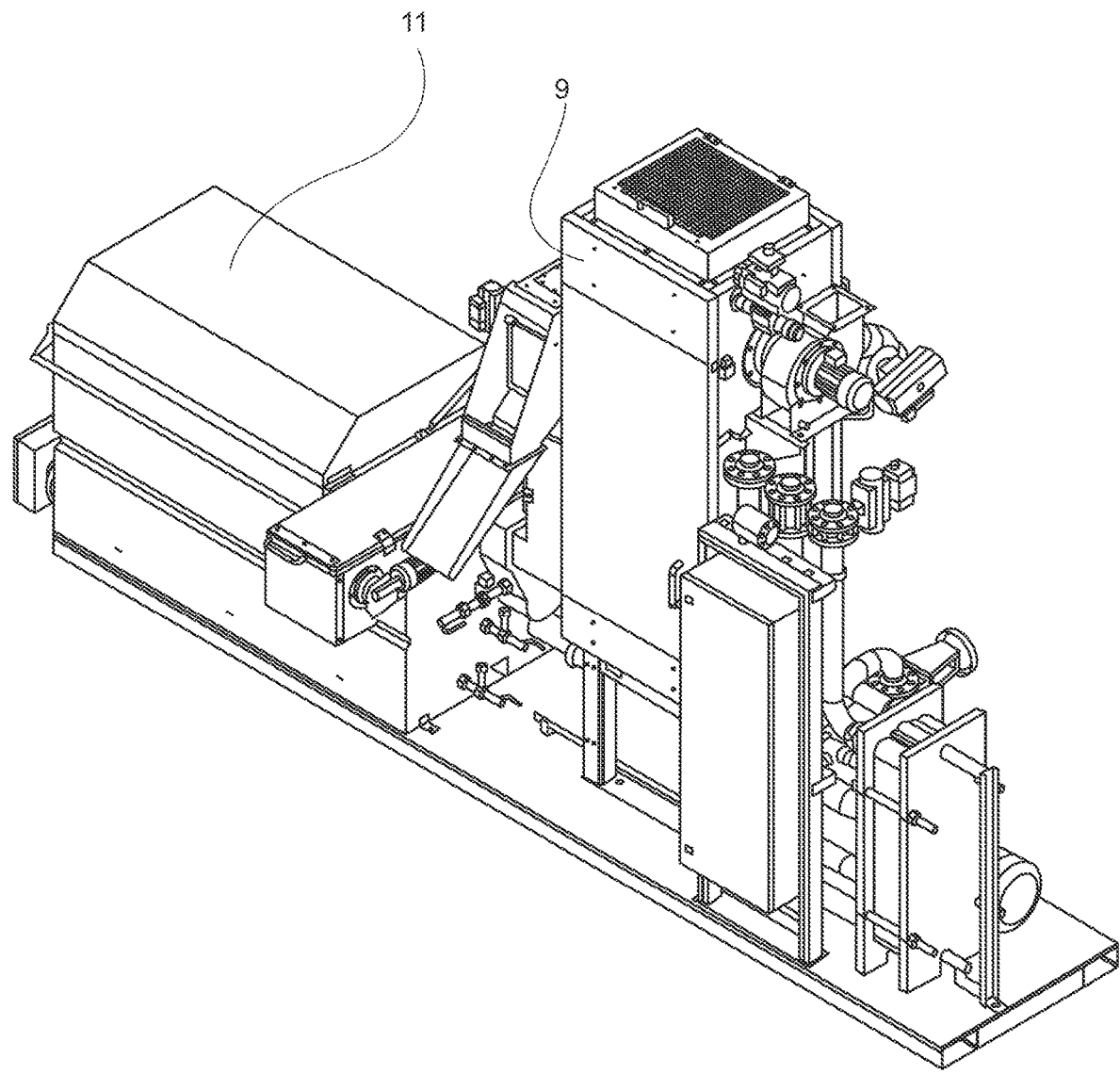
FIG. 16 shows a water treatment device for a pelletizing apparatus as shown in FIG. 1 in a perspective view.

FIG. 16 shows a water treatment device 11 for cleaning process water from the granulation of residues of the polymer melt. The water treatment device 11 in this case is connected in fluid-conducting relationship to the drying device 9 (see also FIG. 1) and is so designed that, in drying of the granules or the pellets from granulation or underwater granulation, by the drying device 9, it cleans remaining process water.

Figure 17:
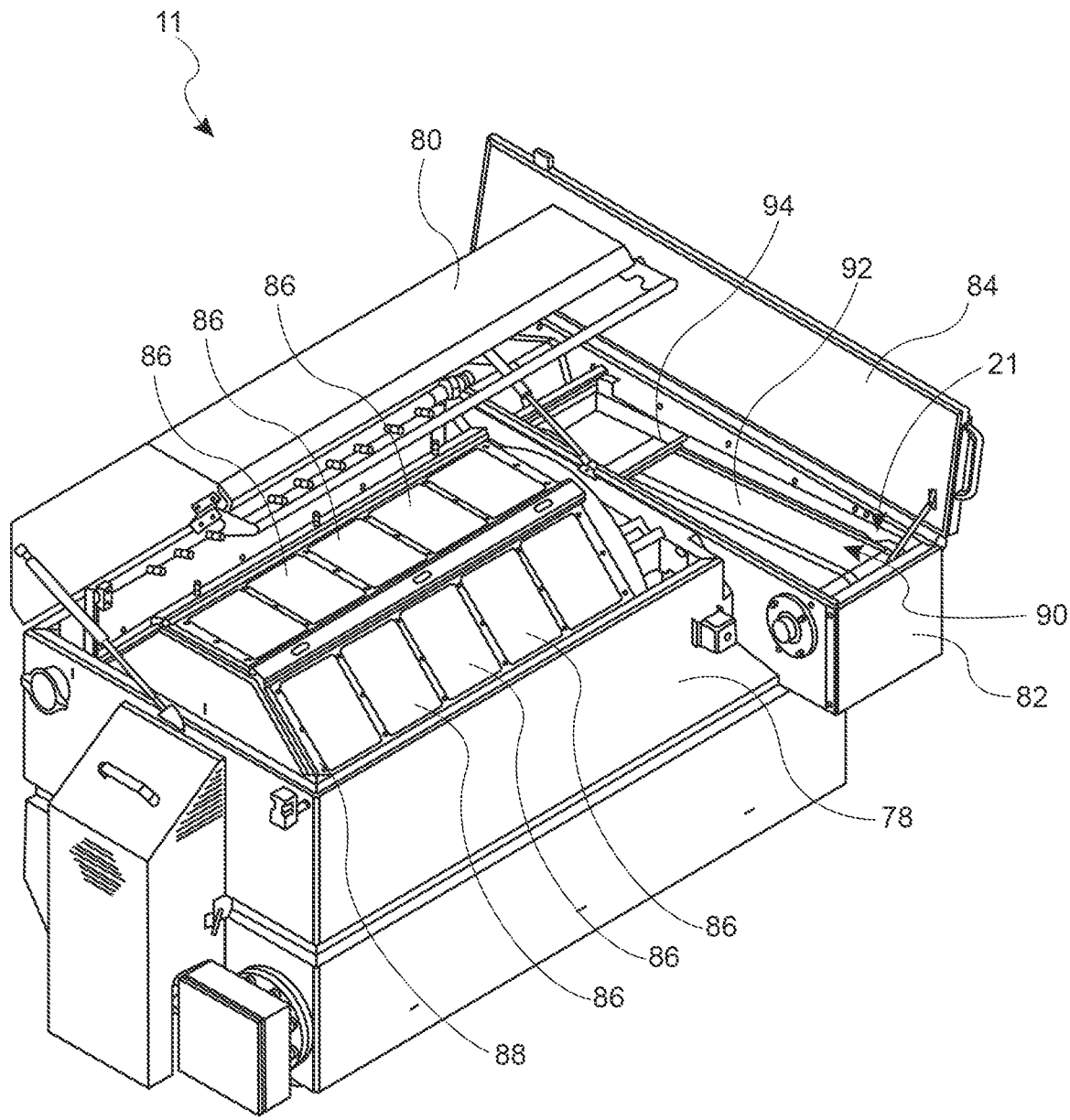
FIG. 17 shows a portion of the water treatment device of FIG. 16 in a perspective view.

FIG. 17 further shows a detailed perspective view of the water treatment device 11.

The water treatment device 11 includes a first housing portion 78 having an opening closable by a first cover 80 which is mounted to the housing portion 78.

The water treatment device 11 further preferably also includes a second housing portion 82 having an opening closable by a second cover 84 mounted to the housing portion 82.

A first water filter 86 is accommodated in the first housing portion 78. The water filter 86 includes a plurality of sieve elements 88 for filtering the process water. The sieve elements 88 have a flat sieve surface, wherein five sieve elements 88 are respectively accommodated in a sieve cassette 88 and are arranged grouped therein. A plurality of those sieve cassettes 88 is arranged in mutually adjoining relationship along a circular path and are accommodated in the housing portion 78 rotatably about an axis of rotation which is fixed through the center point of the circle and extends in the longitudinal direction of the sieve cassettes 88. Rotation of the sieve cassettes 88 is preferably affected by a drive (not shown).

The first housing portion 78 can be connected in fluid-conducting relationship to the granulator 7 or to the drying device 9, as shown in FIG. 16, so that the contaminated process water can pass into the housing portion 78. The water level in the housing portion 78 is monitored. Depending on the water level clean sieve cassettes 88 are moved into the process water or contaminated sieve cassettes 88 are removed from the process water so that clean sieve elements 86 are always available. The sieve cassettes 88 have to be regularly cleaned by virtue of contamination by residues of the polymer melt.

Accommodated in the second housing portion 82 is a second water filter 90 in the form of a continuously operable filter belt. The filter belt 90 shown in FIG. 18 is preferably disposed downstream of the sieve cassettes 88 and is of a higher level of filter fineness in order to be able to filter out even the finest residues which the sieve cassettes 88 do not filter out of the process water.

The filter belt 90 has a filter surface 92 which is guided on a holding means (not shown) and is continuously cleaned by means of a cleaning device 84.

Figure 18:
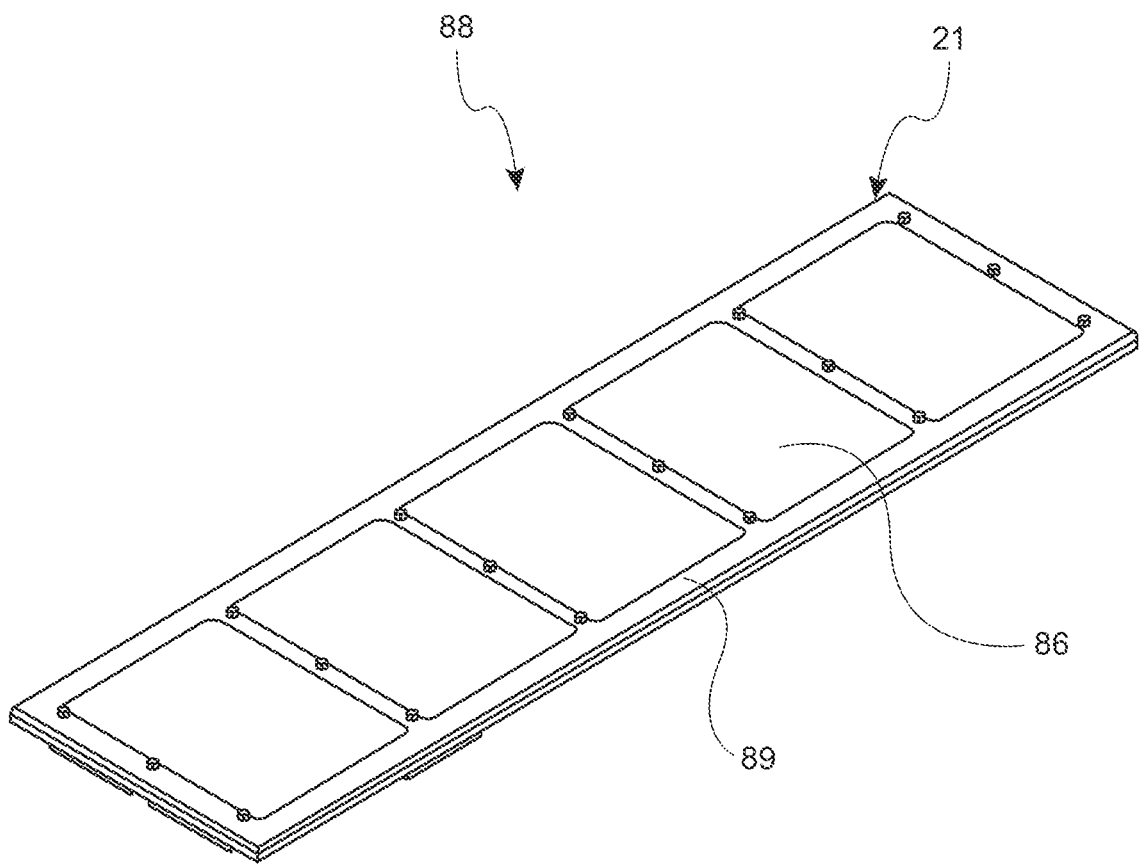
FIG. 18 shows a sieve cassette for a water treatment device as shown in FIGS. 16 and 17.
Figure 19:
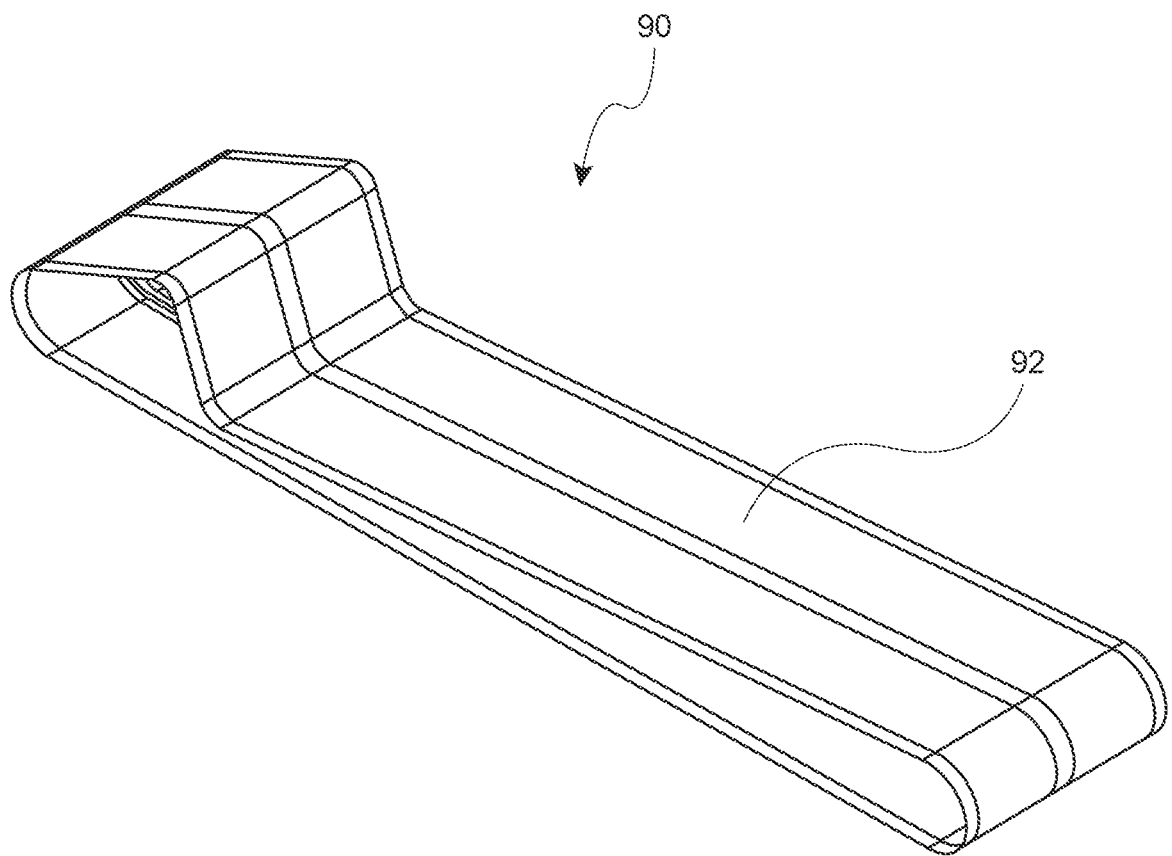
FIG. 19 shows a filter (belt) for a water treatment device as shown in FIGS. 16 and 17 in a perspective view.

As can be seen from FIGS. 16 to 18 the water treatment device 11 includes at least one identification means 21 for storing and providing at least one item of component-specific information. In that respect an identification means 21 is respectively associated with the first water filter 86 or the sieve cassette 88 and the second water filter 90 and is adapted to store at least one item of component-specific information of the water filters 86, 90.

As FIG. 18 shows the sieve cassette 88 includes a frame 89 adapted to accommodate the flat water filters 86. In that case the identification means 21 is mounted to the frame 89.

In addition, the filter element 19 mounted to the filter belt 90 is mounted to the holding means (not shown), as indicated in FIG. 17.

The item or items of component-specific information preferably include an article number and/or a drawing number or a serial number and/or a material identification of the respective component and/or the structural size or dimensions and/or the structural shape and/or filter surface and/or filter fineness and/or an embodiment of series products and/or a maximum filter capacity and/or a target filling level of the respective housing portion 78, 82.

The water treatment device 11 is connected in signal-conducting relationship to a control means adapted to provide at least one control parameter, in particular a water filling level, a belt speed of the filter belt 90, a throughput amount, a conveyor volume flow or a speed of rotation of the sieve cassettes 88.

The control means can also be a control portion of the control means 13 (see FIG. 1).

The control means is connected to a combined reading and writing device 15, 17 adapted to receive the component-specific information from the identification means 21 and/or to overwrite or supplement same.

The control means is adapted to adapt at least one of the above-mentioned control parameters in dependence on the items of component-specific information, to provide the component-specific information and in particular based on the component-specific information to carry out a diagnostic process and/or produce a warning message.

Such a warning message or the result of the diagnostic process can include for example a recommendation to carry out a cleaning operation and/or a maintenance operation and/or replacement of the component provided with the identification means and/or a cooperating component of the water treatment device 11.

What is claimed is:

1. A pelletizing apparatus for a production of thermoplastic pellets, the pelletizing apparatus comprising:
   a filter device configured to be connected in fluid-conducting relationship to a melt feed for separating dirt particles and impurities from a polymer melt;
   a granulator arranged downstream of the filter device and configured to produce polymer pellets;
   a water treatment device configured to clean process water from the dirt particles and impurities of the polymer melt; and
   a control means configured to control at least one of the filter device, the granulator, and the water treatment device, wherein the control means is configured to provide a control parameter for the least one of the filter device, the granulator, and the water treatment device;
   machine-readable and machine-writable identification means configured to store and provide component-specific information, wherein the identification means is associated with a component of the at least one of the filter device, the granulator, and the water treatment device in a flow path of the polymer melt or the process water;
   a reading device connected in signal-conducting relationship to the control means and configured to receive the component-specific information from the identification means; and
   a writing device configured to write and/or overwrite the identification means with the component-specific information,
   wherein the control means is configured to (a) adapt the control parameter in dependence on the component-specific information to thereby adapt operation of the component of the at least one of the filter device, the granulator, and the water treatment device in the flow path of the polymer melt or the process, (b) provide the component-specific information, and (c) execute a diagnostic process based on the component-specific information.

2. The pelletizing apparatus according to claim 1, wherein the filter device has at least one filter element arranged in the flow path of the polymer melt configured to filter the polymer melt, and the identification means is associated with the at least one filter element and is mounted to the at least one filter element.

3. The pelletizing apparatus according to claim 2, wherein the filter element is cylindrical in a form of a filter basket, and the identification means is mounted to a peripheral surface of the filter basket.

4. The pelletizing apparatus according to claim 1, wherein the granulator has an apertured plate arranged in the flow path of the polymer melt and configured to provide a plurality of polymer strands and a blade head mounted rotatably about its longitudinal axis and configured to separate the plurality of polymer strands into individual pellets, and wherein the identification means is associated with the apertured plate and/or the blade head and is mounted to the apertured plate and/or the blade head.

5. The pelletizing apparatus according to claim 4, wherein the apertured plate is of a substantially round cross-section and includes a heating flange and a replaceable cutting plate configured to be introduced into a corresponding receiving means of the heating flange, wherein the identification means is mounted to a periphery of the heating flange and/or a surface at an outlet side of the cutting plate.

6. The pelletizing apparatus according to claim 4, wherein the blade head has a main body and a multiplicity of blades having a cutting edge, the multiplicity of blades replaceably coupled to the main body, wherein the identification means is mounted to a surface extending in orthogonal relationship with the longitudinal axis and/or to the blade spaced in relation to the cutting edge.

7. The pelletizing apparatus according to claim 4, wherein the granulator has a granulator housing and the blade head is mounted to an entrainment member for the blade head, rotatably in the granulator housing, wherein the identification means is associated with the entrainment member and/or the granulator and is mounted to the entrainment member.

8. The pelletizing apparatus according to claim 7, wherein the entrainment member has a shaft and a support portion coupled to the shaft and configured to be brought into contact with the blade head, wherein the identification means is mounted to the shaft and/or the support portion.

9. The pelletizing apparatus according to claim 4, wherein the granulator has a cooling chamber at least partially filled with cooling fluid for cooling the plurality of polymer strands and/or the individual pellets and the apertured plate and the blade head are at least partially arranged in the cooling chamber.

10. The pelletizing apparatus according to claim 1, wherein the water treatment device has at least one water filter configured to filter the process water, and the identification means is associated with the at least one water filter.

11. The pelletizing apparatus according to claim 10, wherein the at least one water filter is in a form of a sieve cassette having a frame structure and a multiplicity of sieve surfaces, and the identification means is mounted to the frame structure.

12. The pelletizing apparatus according to claim 10, wherein the at least one water filter includes a first water filter and a second water filter which is in a form of a filter having a filter belt and a receiving means for the filter belt, and the identification means is mounted to the receiving means.

13. The pelletizing apparatus according to claim 1, wherein the component-specific information stored on the identification means is configured to be read by the reading device magnetically, by way of infrared or radio, and/or can be written and/or overwritten by the writing device.

14. The pelletizing apparatus according to claim 1, wherein the reading and/or the writing device is arranged at a component of the pelletizing apparatus or a machine frame or a stationary portion of a production installation.

15. The pelletizing apparatus according to claim 1, wherein the component-specific information is one of the following:
an article number,
a drawing number,
a serial number,
a material indication of a respective component,
a component size or dimension,
a component shape,
a composition and/or coating thickness of a wear coating,
an embodiment of series products,
a target filling level,
a maximum power output, and
a coefficient of friction or a surface quality.

16. The pelletizing apparatus according to claim 1, wherein the control parameter is one of the following:
a rotary speed,
a speed,
a temperature,
a conveyor volume flow,
a pressure, and
a power output.

17. The pelletizing apparatus according to claim 1, wherein the control means is further adapted in dependence on the component-specific information and the control parameter to determine whether
a cleaning operation is required, and/or
a maintenance operation is required, and/or
a replacement of a component provided with the identification means and/or a cooperating component is required.

18. The pelletizing apparatus according to claim 1, wherein the writing device and the reading device form an integrated reading and writing device for reading and writing and/or overwriting the identification means.

19. The pelletizing apparatus according to claim 1 further comprising:
a melting apparatus arranged upstream of the filter device and configured to liquefy thermoplastic polymers to produce the polymer melt, is the melting apparatus coupled in fluid-conducting relationship to the filter device.

20. The pelletizing apparatus according to claim 1, further comprising a start-up valve arranged in the flow path between the filter device and the granulator and having a valve body and a valve housing, and wherein the identification means is associated with the start-up valve and is mounted to the valve housing.

21. The pelletizing apparatus according to claim 1, wherein the control means is configured to execute the diagnostic process based on the component specific information in order thereby to monitor operation of the at least one of the filter device, the granulator, and the water treatment device and operation of the pelletizing apparatus as a whole.

* * * * *